US012639777B2

(12) United States Patent
Navabi et al.

(10) Patent No.: US 12,639,777 B2
(45) Date of Patent: May 26, 2026

(54) SYSTEMS, METHODS, AND GRAPHICAL USER INTERFACES FOR DONATING SURPLUS FOOD

(71) Applicant: Replate, Oakland, CA (US)

(72) Inventors: Mehran Navabi, Phoenix, AZ (US); Maen Mahfoud, Oakland, CA (US); Katlyn Michelle Marchini, Oakland, CA (US); Anchit Hemang Desai, Berkeley, CA (US); Jackson Derward Rogers, Pleasanton, CA (US); Hanna Hamilton, St. Paul, MN (US)

(73) Assignee: Replate, Oakland, CA (US)

( * ) Notice: Subject to any disclaimer, the term of this patent is extended or adjusted under 35 U.S.C. 154(b) by 99 days.

(21) Appl. No.: 18/066,088

(22) Filed: Dec. 14, 2022

(65) Prior Publication Data

US 2023/0186420 A1 Jun. 15, 2023

Related U.S. Application Data

(60) Provisional application No. 63/289,976, filed on Dec. 15, 2021.

(51) Int. Cl.
*G06Q 50/40* (2024.01)
*G06Q 10/0631* (2023.01)
*G06Q 50/12* (2012.01)

(52) U.S. Cl.
CPC ......... *G06Q 50/40* (2024.01); *G06Q 10/0631* (2013.01); *G06Q 50/12* (2013.01)

(58) Field of Classification Search
CPC ........................................ G06Q 110/00–90/10
See application file for complete search history.

(56) References Cited

U.S. PATENT DOCUMENTS

| | | | | | |
|---|---|---|---|---|---|
| 10,990,911 | B2 * | 4/2021 | Tanno | .................. | G06Q 10/047 |
| 2002/0004749 | A1 | 1/2002 | Froseth et al. | | |
| 2003/0158796 | A1 | 8/2003 | Balent | | |
| 2005/0040230 | A1 | 2/2005 | Swartz et al. | | |
| 2014/0244535 | A1 * | 8/2014 | Costigan | ............ | G06Q 10/0833 |
| | | | | | 705/329 |
| 2015/0262121 | A1 * | 9/2015 | Riel-Dalpe | ............ | G06Q 50/12 |
| | | | | | 705/15 |
| 2016/0300186 | A1 * | 10/2016 | Scharaswak | ....... | G06Q 10/0835 |
| 2016/0334797 | A1 | 11/2016 | Ross et al. | | |
| 2018/0012151 | A1 * | 1/2018 | Wang | ...................... | G06Q 10/08 |
| 2021/0158304 | A1 * | 5/2021 | Waldman | .............. | H04W 4/025 |

OTHER PUBLICATIONS

International Search Report and Written Opinion mailed Mar. 21, 2023, directed to International Application No. PCT/US22/81566; 10 pages.
Navabi. (Apr. 2020). "RePlate Matching Algorithm V1."; 6 pages.

* cited by examiner

*Primary Examiner* — Arif Ullah
(74) *Attorney, Agent, or Firm* — Morrison & Foerster LLP

(57) ABSTRACT

Provided herein are systems and methods for matching and assigning drivers and various logistical agencies to food delivery tasks. The systems and methods increase the efficiency and effectiveness of delivering excess and/or unwanted food from donors to recipients who are in need of food. The systems and methods increase the efficiency and effectiveness by automatically matching each food delivery task to a driver who is able to pick up food from a donor and drop-off food at a recipient.

23 Claims, 17 Drawing Sheets

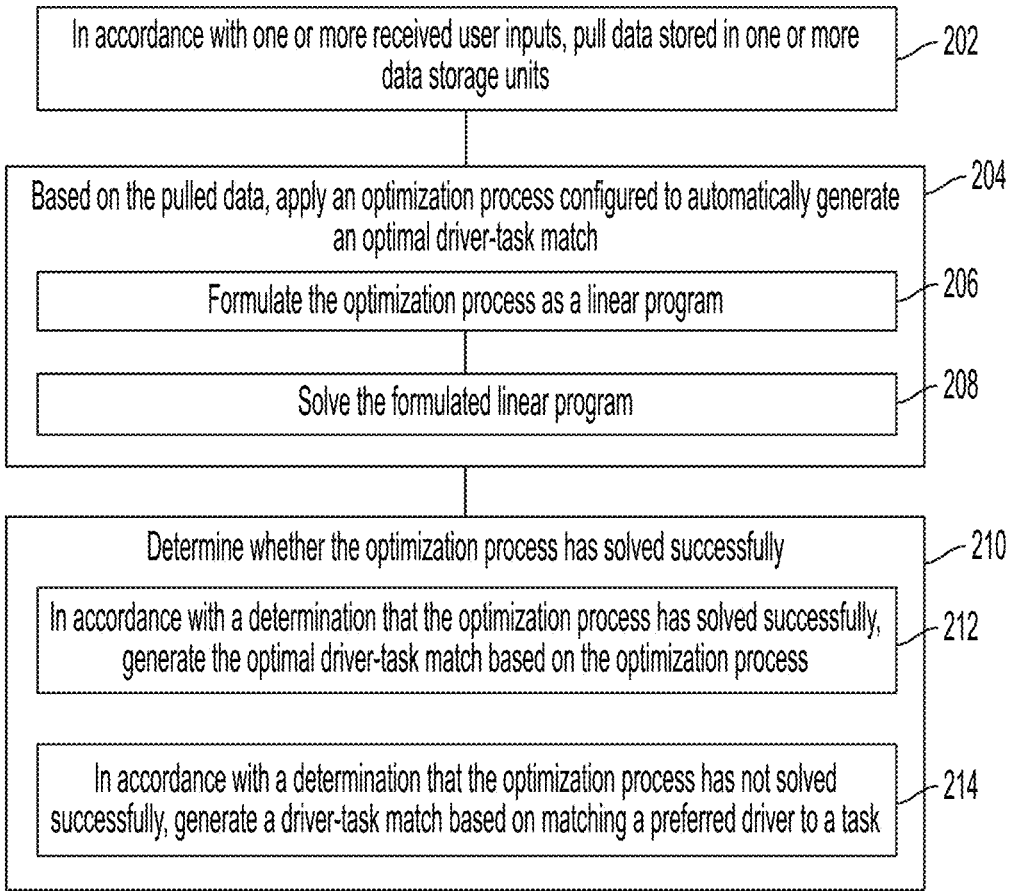

In accordance with one or more received user inputs, pull data stored in one or more data storage units                202

Based on the pulled data, apply an optimization process configured to automatically generate an optimal driver-task match                204

Formulate the optimization process as a linear program                206

Solve the formulated linear program                208

Determine whether the optimization process has solved successfully                210

In accordance with a determination that the optimization process has solved successfully, generate the optimal driver-task match based on the optimization process                212

In accordance with a determination that the optimization process has not solved successfully, generate a driver-task match based on matching a preferred driver to a task                214

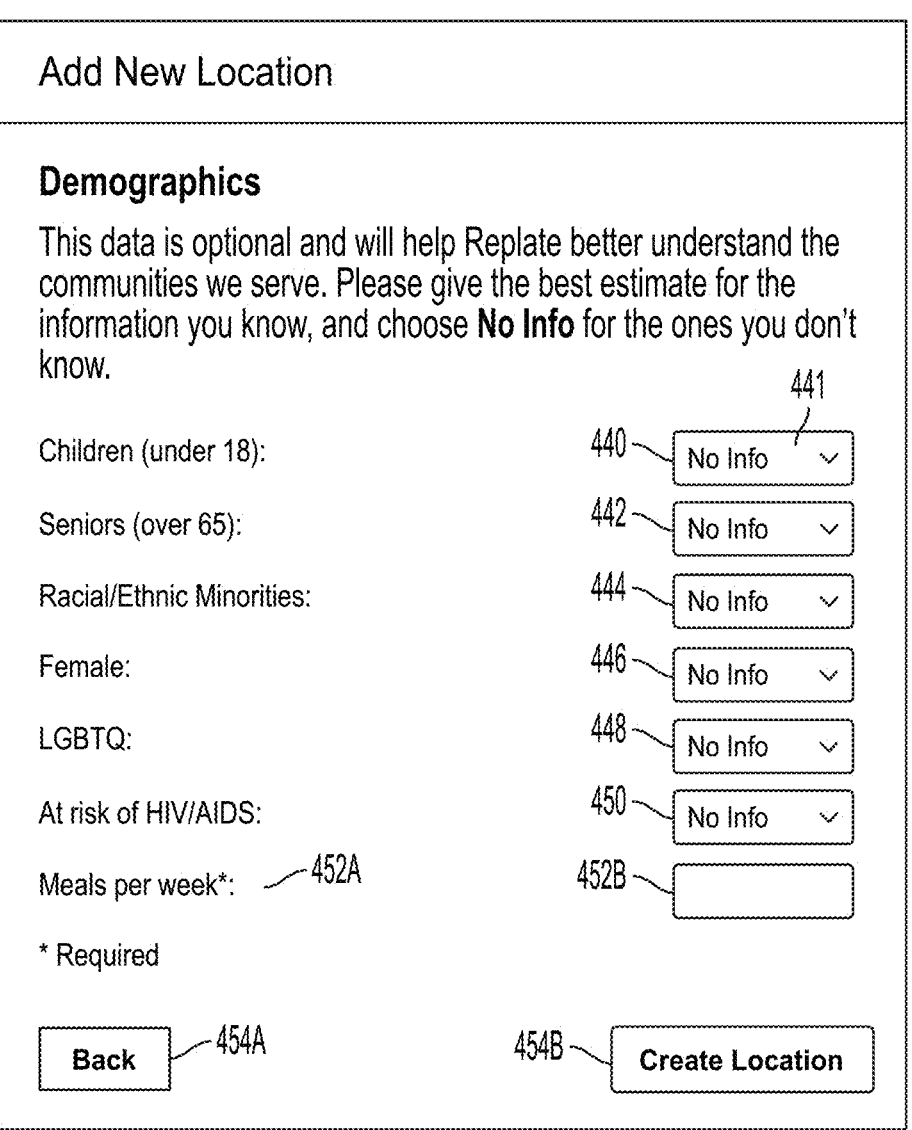

Add New Location

Demographics

This data is optional and will help Replate better understand the communities we serve. Please give the best estimate for the information you know, and choose No Info for the ones you don't know.

441

Children (under 18): 440 — No Info ⌄

Seniors (over 65): 442 — No Info ⌄

Racial/Ethnic Minorities: 444 — No Info ⌄

Female: 446 — No Info ⌄

LGBTQ: 448 — No Info ⌄

At risk of HIV/AIDS: 450 — No Info ⌄

Meals per week*: —452A 452B —

* Required

Back —454A 454B — Create Location

FIG. 4E

SYSTEMS, METHODS, AND GRAPHICAL USER INTERFACES FOR DONATING SURPLUS FOOD

CROSS-REFERENCE TO RELATED APPLICATION

This application claims the benefit of U.S. Provisional Application No. 63/289,976, filed Dec. 15, 2021, the entire contents of which is incorporated herein by reference.

FIELD OF THE DISCLOSURE

This disclosure relates generally to systems, methods, and graphical user interfaces for donating surplus food, and more specifically, to systems, methods, and graphical user interfaces for matching and assigning drivers to food delivery tasks.

BACKGROUND

Food waste—caused when community members such as office workers, chefs, home owners, restauranteurs, grocery store employees, and farmers throw away excess and/or unwanted food—is a widespread problem that plagues many communities across the world. Moreover, food insecurity—a lack of access to enough food to live an active, healthy lifestyle—plagues many of the same communities in which food is wasted.

Traditional processes for donating excess and/or unwanted food include (1) identifying a local person or business (e.g., a religious home or shelter) and personally delivering the excess and/or unwanted food to the local person or business; or (2) working with a local agency that picks up and delivers the excess and/or unwanted food in the community.

However, these traditional processes to donate excess and/or unwanted food, rather than throw it away, are inefficient and ineffective. These traditional processes are inefficient and ineffective because (1) they are time-consuming, costly, and not easily scalable, as a donor has to manually match each donation to a local person, business, or agency; and (2) they cause liability for a donor who may be unaware of food safety issues (e.g., dietary restrictions and/or allergies).

Because these traditional processes are inefficient and ineffective, it is often quicker and cheaper to throw away excess and/or unwanted food rather than donate it. For example, when scaled (e.g., to an increased number of donors and/or recipients, to a larger geographic region, and/or to a longer period of time), the problem of matching donors who have excess and/or unwanted food to recipients who are in need of food gets vastly more complex. When scaled, the problem of matching donors to recipients is so complex, due to the multi-dimensionality of the problem to be solved, that it cannot be done efficiently or effectively in the human mind and cannot easily be automated. Thus, when scaled, the process of matching donors who have excess and/or unwanted food to recipients who receive the excess and/or unwanted food must be optimized so that a computer may find the optimal solution to the problem.

SUMMARY

Accordingly, provided herein are systems and methods for matching and assigning drivers and various logistical agencies to food delivery tasks. The systems and methods increase the efficiency and effectiveness of delivering excess and/or unwanted food from donors to recipients who are in need of food. The systems and methods increase the efficiency and effectiveness by automatically matching each food delivery task to a driver who is able to pick up food from a donor and drop-off food at a recipient.

The systems and methods may be configured to first maximize the amount of food donated (i.e., all food that can possible be donated is donated), and second minimize a cost per meal delivered—defined in terms of monetary cost and/or time needed to deliver meals—by optimizing driver assignments per time period (e.g., per day) per geographic region (e.g., per zone). Once each food delivery task associated with the geographic region during the time period is matched to a driver, a user (e.g., an administrator) of the system may override or confirm a match to assign a driver to a food delivery task.

Moreover, the systems and methods may be configured to store data associated with driver-task matches and/or logistics agencies, such that metrics associated with food delivery tasks may be quantified and shared with stakeholders.

Any one or more of the features or aspects of the examples described below may be combined in whole or in part with one another, and/or may be combined in whole or in part with any other feature or aspect disclosed herein.

BRIEF DESCRIPTION OF THE DRAWINGS

The invention will now be described, by way of example only, with reference to the accompanying drawings, in which:

FIG. 2 depicts a flowchart of a method for using a system for delivering food from donors to recipients, according to one or more examples;

FIGS. 4A-E show aspects of an exemplary graphical user interface displayed to a recipient associated with the system for delivering food from donors to recipients, according to one or more examples;

DETAILED DESCRIPTION

Described herein are systems and methods for delivering food from donors to recipients. In particular, described herein are systems and methods for matching and assigning drivers to electronic food delivery tasks (e.g., food delivery tasks that are requested digitally via user devices) requested by donors and recipients. The systems and methods store data pertaining to the requested electronic food delivery tasks, data pertaining to one or more drivers, and data pertaining to one or more matching processes configured to automatically match a driver to an electronic food delivery task; automatically match a driver to an electronic food delivery task by applying a matching process of the one or more matching processes; and based at least in part on the automatic match, assign a driver to each requested electronic food delivery task. Applying the matching process may comprise one or more steps, one of which may comprise applying an optimization process configured to minimize a cost associated with matching a driver to an electronic food delivery task.

In one or more examples, the optimization process may be applied for a geographic region (e.g., a zone indicative of a zone), and for a predetermined time period (e.g., a day), such that a driver is automatically matched to each electronic food delivery task associated with the geographic region during the predetermined time period. Thus, the optimization process may automatically generate optimal matches per region per time period. Once the optimization process has automatically generated matches within a region for a given time period, a user (e.g., an administrator) of the system may assign a driver to each electronic food delivery task by confirming or overriding a generated match. Moreover, after a driver is assigned to a task, the driver may accept or reject the assignment. Thus, in one or more examples, the systems and methods described herein are systems and methods configured to automatically match an electronic food delivery task to a driver, and then to receive user input to confirm, override, or reject the match.

The systems and methods described herein enable more efficient and more effective delivery of excess and/or unwanted food from donors to recipients who are in need of food. In particular, the systems and methods described herein enable more efficient and more effective food delivery from donors to recipients by solving the problem of matching donors who have excess and/or unwanted food to recipients who are in need of food in a computationally efficient manner that is easily scalable. The systems and methods disclosed address the problems and shortcoming of known processes to deliver excess and/or unwanted food from donors to recipients, as described above.

Figure 1:
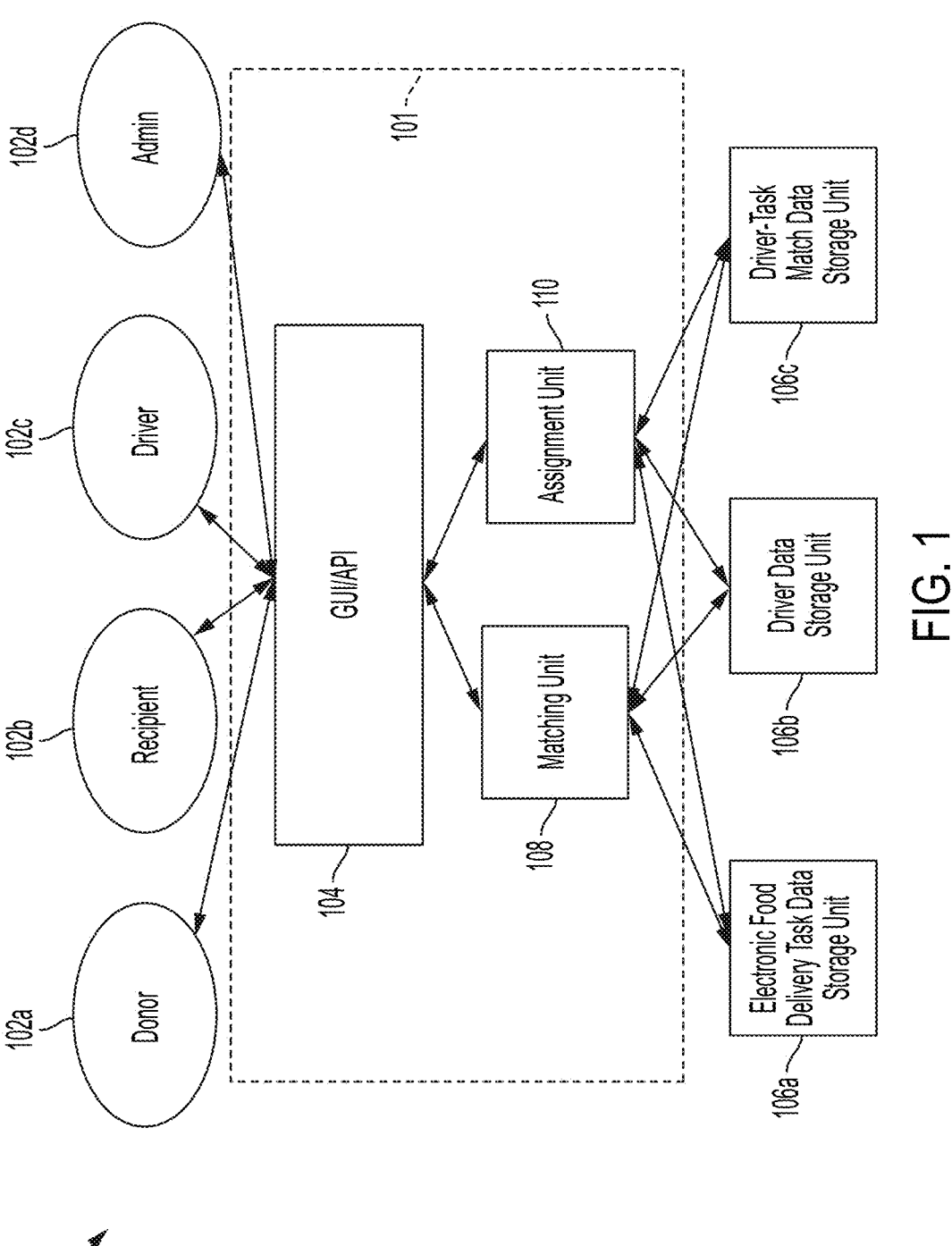
FIG. 1 illustrates an exemplary system architecture of a system for delivering food from donors to recipients, according to one or more examples.

FIG. 1 depicts a system 100 for delivering food from donors to recipients. In particular, system 100 is used to match and assign drivers to electronic food delivery tasks requested by donors and recipients. System 100 may comprise electronic food delivery task matching and assignment tool 101 that can comprise any computer, processor, server, etc. that is configured to execute a method of driver-task matching and assignment as described herein. Tool 101 may comprise graphical user interface unit 104, matching unit 108, and/or assignment unit 110, as described further below. The graphical user interface unit 104, matching unit 108, and assignment unit 110 may be provided by the same computer, processor, or server; additionally or alternatively, one or more of said units may be provided by a different computer, processor, or server (e.g., tool 101 and/or system 100 may be provided in whole or in part as a server-hosted computing system, a distributed computing system, and/or a cloud-based system). In one or more examples, system 100 may additionally comprise donor 102a, recipient 102b, driver 102c, administrator 102d (each of which may be (or include) a user device and/or user system associated with a user), electronic food delivery task data storage unit 106a, driver data storage unit 106b, and/or driver-task match data storage unit 106c, each of which may be communicatively coupled (e.g., by wired or wireless network communication) with tool 101. In one or more examples, donor 102a, recipient 102b, driver 102c, administrator 102d, electronic food delivery task data storage unit 106a, driver data storage unit 106b, and/or driver-task match data storage unit 106c may be included within tool 101.

A donor (e.g., the user associated with donor 102a) and a recipient (e.g., the user associated with recipient 102b) may each interact with a graphical user interface unit (e.g., graphical interface unit 104) to request an electronic food delivery task. In response to request of an electronic food delivery task, input information pertaining to the electronic delivery task may be stored in a data storage unit (e.g., electronic food delivery task data storage unit 106a). Additionally, information pertaining to one or more drivers (e.g., the user associated with driver 102c) may be ingested into system 100 and stored in a data storage unit (e.g., driver data storage unit 106b). An administrator (e.g., the user associated with administrator 102d) may then interact with the graphical user interface to initiate a matching process configured to automatically match each electronic food delivery task to a driver (e.g., the user associated with driver 102c). In one or more examples, the administrator may specify to apply the matching process for each electronic food delivery task associated with a particular geographic region (e.g., a zone) and a particular time period (e.g., a day). Once a driver-task match is automatically generated upon application of the matching process (e.g., via matching unit 108), it may be stored in a data storage unit (e.g., driver-task match data storage unit 106c). Further, once a driver-task match is generated, a driver-task assignment may be generated (e.g., via assignment unit 110) based on the generated driver-task match and/or input (e.g., via the graphical user interface) from the administrator, the donor, the recipient, and/or the driver.

In one or more examples, graphical user interface unit 104 may be configured to generate and/or provide one or more instructions for rendering and/or displaying a graphical user interface. As will be described further below, the graphical user interface unit 104 may be configured to receive one or more inputs from a donor (e.g., the user associated with donor 102a), a recipient (e.g., the user associated with recipient 102b), a driver (e.g., the user associated with driver 102c), and/or an administrator (e.g., the user associated with administrator 102d), and/or update rendering and/or display of the graphical user interface in response to the one or more user inputs. In one or more examples, the graphical user interface unit may interface with one or more APIs (e.g., REST APIs) to generate and display visualizations of data. In one or more examples, the graphical user interface may be displayed on any hardware platform. In one or more examples, display of the graphical user interface may be platform agnostic by leveraging APIs configured to integrate with a wide range of hardware platforms.

In one or more examples, donor 102a may be a user device associated with a donor of system 100. The donor may be a member of an organization that can generate one or more pickup electronic food delivery tasks, in which excess and/or unwanted food is donated. Thus, the donor may interact with system 100 to efficiently and effectively donate excess and/or unwanted food. Previously, even if the donor wished to donate excess and/or unwanted food, there was no easy or effective way for them to donate the excess and/or unwanted food—the donor was unable to donate food in a scalable manner such that many donations could be made and/or many recipients in need of food could be served.

In one or more examples, data associated with a donor (e.g., the user associated with donor 102a) may be ingested into system 100 in response to one or more inputs from the donor. As will be described further with respect to FIGS. 3A-F, in one or more examples, the donor may interact with system 100 by adding a new donor location and/or by scheduling a new pickup task. In one or more examples, the donor may specify one or more parameters associated with a new donor location. In one or more examples, the one or more parameters for the new donor location may include a location name and/or a location address. In one or more examples, the donor may specify one or more parameters associated with a new pickup task. In one or more examples, the one or more parameters for the new pickup task may include a pickup name, a pickup location, a pickup frequency, a pickup date, a pickup time, a quantity of food, a pickup comment (e.g., a listing of the type(s) of food being donated), and/or a building instruction.

In one or more examples, recipient 102b may be a user device associated with a recipient of system 100. The recipient may be a member of an organization that can generate one or more drop-off electronic food delivery tasks, in which excess and/or unwanted food is dropped off. Thus, the recipient may interact with system 100 to receive food. Previously, even if the recipient wished to receive food, there was no easy or effective way for them to receive food—donors were unable to donate food in a scalable manner, and instead may have thrown away food.

In one or more examples, data associated with a recipient (e.g., the user associated with recipient 102b) may be ingested into system 100 in response to one or more inputs from the recipient. As will be described further with respect to FIGS. 4A-E, in one or more examples, the recipient may interact with system 100 by adding a new recipient location and/or by scheduling a new drop-off task. In one or more examples, the recipient may specify one or more parameters associated with a new recipient location. In one or more examples, the one or more parameters for the new recipient location may include a location name, a location address, and/or demographic information (e.g., information pertaining to one or more minority groups served by the location). In one or more examples, the recipient may specify one or more parameters associated with a new drop-off task. In one or more examples, the one or more parameters for the new drop-off task may include a name, a location, a drop-off frequency, a drop-off date, a drop-off time, a quantity of food, a drop-off comment (e.g., a listing of type(s) of food that the recipient cannot receive (e.g., due to food allergies and/or sensitivities)), and/or a building instruction.

In one or more examples, driver 102c may be a user device associated with a driver of system 100. The driver may be a member of an organization that can complete assigned pickup tasks and assigned drop-off tasks. The driver effectively and efficiently delivers food from donors to recipients by completing assigned tasks. In one or more examples, data associated with the driver may be stored externally from system 100 (e.g., using another platform) and ingested into system 100. As will be discussed with respect to FIGS. 3A-5C, in one or more examples, the driver may interact with system 100 to view, confirm, and/or reject assigned tasks.

In one or more examples, administrator 102d may be a user device associated with an administrator of system 100. The administrator may be a member of an operations team that manages food delivery from donors to recipients. In one or more examples, the administrator may manage food delivery from donors to recipients by matching and assigning each task requested by a donor (e.g., the user associated with donor 102a) or a recipient (e.g., the user associated with recipient 102b) to a driver (e.g., the user associated with driver 102c). To manage food delivery, the administrator may interact with system 100 in a variety of ways. As will be described further with respect to FIGS. 5A-C, in one or more examples, the administrator may (1) provide zone data, driver data, and/or matching process data; (2) initiate a matching process configured to automatically generate driver-task matches; and/or (3) generate driver-task assignments.

In one or more examples, data ingested into system 100 may be stored in one or more data storage units. As depicted in FIG. 1, system 100 may comprise electronic food delivery task data storage unit 106a, driver data storage unit 106b, and/or driver-task match data storage unit 106c. In one or more examples, each data storage unit may be configured to store one or more data sets. In one or more examples, each data storage unit may comprise one or more databases which organize stored data sets. Each database may support data structures such as strings, integers, hashes, tables, arrays, lists, tuples, stacks, queues, bitmaps, trees, graphs, any combination thereof, or the like.

In one or more examples, data stored in each data storage unit may be processed such that the data can be used to generate driver-task matches and assignments. Processing the data may comprise (1) standardizing the data (e.g., converting data to a common format); and/or (2) cleansing the data (e.g., replacing, modifying, and/or deleting corrupt, incomplete, incorrect, inaccurate, and/or irrelevant entities; fixing structural errors, such as typos or inconsistent naming conventions; and/or filtering entities). Processing the data may be particularly important for the driver data which is ingested into system 100. In one or more examples, data may be processed automatically (e.g., immediately after ingestion into system 100). In one or more examples, data may be processed in accordance with a user input from an administrator (e.g., the user associated with administrator 102d) to initiate data processing. The user input may specify which data to process and/or how to process the data. Thus, some or all of the data stored in system 100 may be transformed such that the data may be used to generate driver-task matches and assignments.

In one or more examples, electronic food delivery task data storage unit 106a may be configured to store one or more data sets pertaining to electronic food delivery tasks requested by a donor (e.g., the user associated with donor 102a) and/or a recipient (e.g., the user associated with recipient 102b) and/or zone data provided by an administrator (e.g., the user associated with administrator 102d). In one or more examples, the one or more data sets may include a donor data set, a recipient data set, a zone data set, and/or a task data set. In one or more examples, each data set may comprise one or more entities.

In one or more examples, the donor data set may store data representing one or more donors. In one or more examples, entities of the donor data set may be grouped (e.g. by geographic region such as zone). Moreover, in one or more examples, the donor data set may additionally include aggregated data (e.g., summary information including a number of donations made, a quantity of food donated, a quantity of waver saved, a quantity of meals served, and/or a quantity of carbon dioxide diverted) for a donor and/or a donor organization, such that a quantifiable impact of completed donations may be demonstrated to stakeholders.

In one or more examples, the recipient data set may store data representing one or more recipients including information about the recipient's address, the type of food requested, amount of food requested, recurring vs. one time deliveries, etc. In one or more examples, entities of the recipient data set may be grouped (e.g., by geographic region such as zone).

In one or more examples, the zone data set may store data representing one or more geographic zones. In one or more examples, an entity of the zone data set may represent a zone. In one or more examples, the entity may be associated with one or more of the following attributes: a zone identifier; a name of the zone; one or more postcodes included in the zone; a country in which the zone is located; an identification of a default driver for the zone; and a timezone for the zone.

In one or more examples, the task data set may store data representing one or more electronic food delivery tasks. In one or more examples, the entity may be associated with one or more of the following attributes. In one or more examples, entities of the task data set may be grouped (e.g., by period of time, such as day and/or by geographic region, such as zone).

In one or more examples, in response to inputs from a donor (e.g., the user associated with donor 102a), a recipient (e.g., the user associated with recipient 102b), and/or an administrator (e.g., the user associated with administrator 102d), data stored in electronic food delivery task data storage unit 106a may be added and/or modified. For example, a new entity may be added to the donor data set and/or the task data set in response to receipt of a new pickup task. Similarly, a new entity may be added to the recipient data set and/or the task data set in response to receipt of a new drop-off task.

In one or more examples, driver data storage unit 106b may be configured to store one or more data sets pertaining to driver data. As discussed above, the driver data may be ingested into system 100 in response to a user input (e.g., an input from the user associated with administrator 102d) to ingest the driver data. In one or more examples, based on the ingested data, driver data storage unit 106b may store a driver data set, a shift data set, and/or a driver activity data set. In one or more examples, each data set may comprise one or more entities.

In one or more examples, the driver data set may store data representing one or more drivers. In one or more examples, an entity of the driver data set may represent a schedule for a driver for a specified day. In one or more examples, the entity may be associated with one or more of the following attributes: an identifier identifying the driver associated with the data structure; a name; a geographic location pertaining to a starting location of the driver, wherein the geographic location may comprise latitude and longitude coordinates; a capacity of the driver, wherein the capacity of the driver may be indicative of a quantity of items the driver can store in his or her vehicle; and a zone identifier that indicates a zone with which the driver is associated.

In one or more examples, the shift data set may store data representing one or more shifts. In one or more examples, an entity of the shift data set may represent a shift for a specific date and time on a driver's schedule. In one or more examples, the entity may be associated with one or more of the following attributes: a shift identifier; a driver identifier; a start time of the shift, and an end time of the shift.

In one or more examples, the driver activity data set may store data representing one or more activities assigned to a driver, and specifically information about an activity's pickup location, drop-off location, time of pickup, start date, end date, amount of food to be picked up/dropped off, and other information associated with a given activity.

In one or more examples, in response to updates to data stored on the external platform, data stored in driver data storage unit 106b may be updated. The data stored in driver data storage unit 106b may be updated manually (e.g., in response to a user input from the user associated with administrator 102d) or automatically (e.g., each time the data stored on the external platform is updated, after a pre-defined number of updates, or after a pre-defined increment of time). Thus, driver data stored in data storage unit 106b may be updated in real-time or near real-time to accurately reflect data stored on the external platform.

In one or more examples, driver-task match data storage unit 106c may be configured to store one or more data sets pertaining to driver-task matches. In one or more examples, driver-task match data storage unit 106c may store a matching process data set and/or a match data set. As discussed above, matching process data may be ingested based on one or more user inputs (e.g., one or more inputs from the user associated with administrator 102d). As will be discussed further below, match data may be automatically generated in response to application of a matching process. In one or more examples, each data set may comprise one or more entities.

In one or more examples, the matching process data set may store data representing one or more matching processes configured to generate one or more driver-task matches. In one or more examples, an entity of the matching process data set may represent a first matching process used to generate the one or more driver-task matches. In one or more examples, the entity may be associated with one or more of the following attributes: a matching process identifier; a solver identifier, wherein the solver identifier is indicative of the matching process used; and one or more model parameters.

In one or more examples, the one or more parameters may include one or more of the following: an external logistics parameter, wherein the external logistics parameter is indicative of a supplier cost (e.g., in dollars) of assigning a task to a driver who is a classified as a member of an external logistics partner (e.g., a food delivery organization such as DoorDash); an internal logistics parameter, wherein the internal logistics parameter is indicative of a travel cost (e.g., in distance) of assigning a task to a driver who is classified as a member of an internal logistics team; an expected completion rate parameter, wherein the expected completion rate parameter is indicative of a number of tasks per hour a driver is expected to complete; a buffer start period parameter, wherein the buffer start period parameter is indicative of a number of hours after a start of a shift that a driver is expected to complete a first assigned task; and a buffer end period parameter, wherein the buffer end period parameter is indicative of a number of hours before an end of a shift that a driver is expected to complete a last assigned task. In one or more examples, the parameters can also include an acceptable supply shortage parameter and an acceptable supply excess parameter.

In one or more examples, the one or more parameters may include a plurality of external logistics parameters indicative of a plurality of supplier costs (e.g., if a first cost to assign a task to a driver of a first external logistics partner is different that a second cost to assign the task to a driver of a second external logistics partner). In one or more examples, the one or more parameters may include a plurality of internal logistics parameters indicative of a plurality of travel costs and/or a plurality of expected completion rate parameters indicative of a plurality of expected completion rates (e.g., if a first driver is known to be less costly than a second driver and/or if the first driver is known to complete tasks at a different rate than the second driver).

Thus, a driver-task match may be generated in accordance with a selection of one of a plurality of matching processes configured to generate driver-task matches. In one or more examples, the first matching process may differ from a second matching process based on one or more process formulation differences and/or one or more attribute differences (e.g., one or more parameter differences) between the processes. It may be advantageous to store a plurality of matching processes at least to keep track of different matching processes capable of being implemented and/or to keep track of which matching process was used to generate a match.

In one or more examples, the match data set may store data representing one or more driver-task matches. In one or more examples, an entity of the match data set may represent a driver-task match. In one or more examples, the entity may be associated with one or more of the following attributes: a match identifier; a time at which the match was generated and/or populated into the match data set; a zone identifier; a driver identifier; a task identifier; a matching process identifier; a logistics agency identifier and a confirmation level. In one or more examples, the confirmation level may be a categorical value that signifies (1) whether the match has been generated automatically by a matching process ("process level"); (2) whether the match has been assigned by an operations team member ("operations level"); and/or (3) whether the match has been confirmed by the assigned driver ("driver level"). Thus, in one or more examples, a plurality of entities for the same driver-task pair may be generated, wherein a first entity of the plurality of entities is associated with a different confirmation level than is a second entity of the plurality of entities.

In one or more examples, data stored in driver-task match data storage unit 106c may automatically be updated in response to application of a matching process configured to match each electronic food delivery task to a driver. For example, the matching process data set and/or the match data set may be updated by adding an entity to the respective data set. Similarly, in response to application of a matching process configured to match each electronic food delivery task to a driver, the zone data set described with respect to electronic food delivery task data storage unit 106a, the driver data set described with respect to driver data storage unit 106b, and/or the shift data set described with respect to driver data storage unit 106b may be updated.

While FIG. 1 is shown and described with respect to four types of users—donor, recipient, driver, and administrator—system 100 may include any number of users and any type of user. Similarly, while FIG. 1 is shown to include three data storage units and is described with respect to storing data in specific data sets included within each data storage unit, system 100 may include any number of data storage units used to store data in any number of and any type of data sets.

In one or more examples, once data pertaining to one or more electronic food delivery tasks, one or more drivers, and one or more matching processes is ingested and stored in system 100, an administrator (e.g., the user associated with administrator 102d) may initiate a matching process to match each received task with a driver. As will be described further with respect to FIGS. 5A-B, in one or more examples, the administrator may select a particular matching process to apply for a particular geographic region (e.g., a zone indicative of a zone) and for a particular time period (e.g., a day). Applying the matching process for a zone and for a day may be advantageous at least to reduce the computing time and/or resources needed to match a task to a driver. In one or more alternative examples, the matching process may be applied for a plurality of zones and/or a plurality of days, which may be advantageous at least to generate more matches upon applying the matching process. Moreover, selecting a particular matching process from a plurality of possible matching process may be advantageous at least to ensure that the matching process is best suited for the problem to be solved. In one or more examples, the matching process to apply may be selected based on a desired process formulation and/or based on one or more desired parameters to be used to match an electronic food delivery task to a driver. In one or more examples, as will be described further with respect to FIGS. 5A-B, the administrator may additionally select to apply a selected matching process for pickup tasks requested by donors, drop-off tasks requested by recipients, or both. Thus, the administrator may flexibly define the scope of the problem to be solved to ensure that only the requisite computing resources are used to generate driver-task matches.

In one or more examples, matching unit 108 may be configured to automatically generate driver-task matches based on inputs made by the administrator. The matching unit may generate driver-task matches by applying a matching process to the transmitted data. In one or more examples, applying the matching process may comprise any one or more of the steps of FIG. 2.

Turning to FIG. 2, at step 202, in one or more examples, the matching process may pull data stored in electronic food delivery task data storage unit 106a, driver data storage unit 106b, and driver-task match data storage unit 106c to automatically apply a selected matching process configured to automatically generate a driver-task match for each task associated with a selected time period and geographic region. As discussed above, in one or more examples, data stored in the data storage units may be processed such that it is in a format that may be efficiently and effectively pulled by the matching process. In one or more examples, rather than pull all data stored in the data storage units, the matching process may pull only the portion of the data that corresponds to the selected time period and geographic region (e.g., by querying the data sets such that only entities that correspond to the selected time period and geographic region). Moreover, the matching process may only pull data included in some of the data sets described above with respect to electronic food delivery task data storage unit 106a, driver data storage unit 106b, and driver-task match data storage unit 106c. In one or more examples, the matching process may pull data from the zone data set, the donor data set, and the recipient data set of electronic food delivery task data storage unit 106a; from the driver data set and the shift data set of driver data storage unit 106b; and optionally from the location data set (applied to the donor, recipient, or both), the activity data set, and the match data set of driver-task match data storage unit 106c. Thus, the matching process may efficiently and effectively pull the requisite data needed to generate driver-task matches.

In one or more examples, the data pulled by the matching process may comprise data pertaining to (1) task IDs and driver IDs, (2) one or more assignments previously generated, and/or (3) a preferred driver corresponding to the selected time period and the selected zone.

In one or more examples, providing the task ID and driver ID data may be important at least to ensure that each task and each driver associated with the day and the zone are taken into account when applying the matching process. In one or more examples, the task ID and driver ID data may be pulled from the driver data set, the driver activity data set, the task data set, and the zone data set.

In one or more examples, pulling data pertaining to one or more assignments previously generated for the day and the zone may be important at least to ensure that the matching process does not match a task indicated by the assignment to a different driver than that driver indicated by the assignment. In one or more examples, the data pertaining to the one or more assignments previously generated for the zone and the day may be provided by pulling data from the match data set. In one or more examples, the data pulled from the match data set is associated with an "operations level," indicating that it has previously been assigned.

In one or more examples, pulling data pertaining to the preferred driver corresponding to the selected day and zone may be important at least to ensure that each task corresponding to the selected day and zone can be matched to a driver. As will be discussed with respect to steps 210-214, the matching process may automatically generate a match based at least in part on the preferred driver data. In one or more examples, data pertaining to the preferred driver corresponding to the selected day and zone may be pulled from the zone data set.

In one or more examples, before providing the data to the selected matching process, the data may be processed. Processing the data before providing it to the selected matching process may be advantageous at least to ensure that it is can easily and effectively be used by the selected matching process. For example, processing the data may comprise converting the data into a proper format for use by the selected matching process. In one or more examples, processing the data may comprise standardizing the data and/or cleansing the data, as described with respect to FIG. 1.

Thus, based on the provided data, the selected matching process may be applied to automatically generate a match for each electronic food delivery task corresponding to the selected day and the selected zone.

While step 202 has been described with respect to applying a matching process configured to automatically generate a match for each electronic food delivery task corresponding to a selected zone and a selected day, a matching process may alternatively be applied to automatically generate a match for an individual electronic food delivery task. The one or more user inputs received may comprise an additional user input to specify a task ID for which to apply the matching process. In accordance with the additional user input, the data pulled by the matching process may correspond to the selected zone, the selected day, and the selected task ID.

At step 204, in one or more examples, applying the matching process may comprise applying an optimization process configured to generate an optimal driver-task match. As will be discussed further below, the optimization process may be configured to generate an optimal driver-task match based on minimizing a cost associated with completion of an electronic food delivery task. In one or more examples, the data discussed with respect to step 202 and data pertaining to the one or more parameters associated with the selected matching process may be provided to the optimization process. For example, parameter data, driver data, task data, and preferred driver data may be provided to the optimization process.

In one or more examples, the optimization process may be a linear program configured to generate an optimal driver-task match. Applying a linear program to generate an optimal driver-task match may be advantageous at least to generate the optimal driver-task match in a computationally efficient manner. The problem described herein, generating driver-task matches for a zone for a day, is an NP-hard problem. As known to one of ordinary skill in the art, solving an NP-hard problem is at least as hard as solving any NP problem, which may be solved in polynomial time by a nondeterministic Turing machine. Thus, the linear program may be applied to generate driver-task matches in a computationally efficient manner which is otherwise impractical and/or impossible.

As known to one of ordinary skill in the art, a linear program is defined by a set of decision variables, one or more constraints, and an objective function. The goal of applying a linear program is to determine optimal values for the decision variables, such that they satisfy each constraint and result in an optimal value for the objective function. Moreover, as known to one of ordinary skill in the art, two types of linear programs exist: non-integer linear programs and integer linear programs. For a non-integer linear program, each decision variable may take on any value from a continuous set. For an integer linear program, each decision variable may only be able to take on a value from an integer set. For example, a decision variable $X$ may only be able to take on a value from the set $\{1, 3, 4, 7, 9\}$ or the set $\{0, 1\}$. It is typical for the domain of an integer decision variables to be $\{0, 1\}$ such that the variable is modeled as a binary decision variable. As it relates to the disclosure described herein, a binary decision variable may represent a decision of whether or not a specific driver should pick up food from a specific donor.

Furthermore, as known to one of ordinary skill in the art, an integer linear program is computationally much more difficult to solve than is a non-integer linear program (e.g., due to the combinatorial nature of selecting a value for each decision variable of an integer linear program). Many solvers used to solve linear programs solve a sequence of non-integer linear programs in an iterative manner (e.g., by using the Simplex solving process in each iteration). Two examples of such solvers are Gurobi and Google OR Tools. Thus, a key aspect of applying a linear program is formulating the linear program.

At step 206, in one or more examples, a first step of applying the optimization process may comprise formulating the optimization process. In one or more examples, the optimization process may be formulated as a non-integer linear program configured to generate an optimal driver-task match. In one or more examples, the optimization process may not need to be formulated each time the optimization process is run. Rather, the optimization process may only need to be formulated once, or may only need to be formulated periodically. Configuring the optimization process to generate an optimal driver-task match, and not to additionally determine an optimal route that a driver should travel to complete a task, may be advantageous at least to simplify formulation of the optimization process. Thus, the formulated non-integer linear program may require fewer computing resources to be solved and/or may be solved significantly quicker than if it were configured to both optimally match a driver to a task and optimally determine a route that a driver should travel to complete the task. Moreover, formulation of the non-integer linear program may be simpler to achieve, thus enabling more rapid formulation of the non-integer linear program.

In one or more examples, formulation of the non-integer linear program may comprise specifying an objective, one or more decision variables, and one or more constraints.

In one or more examples, the objective may be to minimize a cost associated with completion of an electronic food delivery task. In one or more examples, as described with respect to FIG. 1, a task may be completed by a driver who is a member of an internal logistics team or a driver who is a member of an external logistics partner. In one or more examples, it may be advantageous to partner with one or more external logistics partners to complete electronic food delivery tasks at least because the external logistics partner(s) may be tapped into on-demand to ensure that all tasks for a selected zone for a selected day are completed. This is particularly important because the quantity of tasks that the internal operations can complete is finite. Moreover, a quantity of tasks may vary (e.g., the quantity of tasks may be high around a holiday or a high period of unemployment), such that it may not make sense to hire additional internal logistics team members. In one or more examples, a task is only completed by an external logistics partner if the task cannot be completed by a driver who is a member of the internal logistics team.

Further, in one or more examples, a cost associated with completion of a task by a driver who is classified as a member of an external logistics partner may be calculated differently than is a cost associated with completion of the task by a driver who is classified as a member of an internal logistics team. In one or more examples, the cost associated with completion of the task by a driver who is a member of an external logistics partner may be a dollar amount paid upon completion of the task. The dollar amount may depend on which external logistics partner the driver is a member of. In one or more examples, the cost associated with completion of the task by a driver who is a member of an internal logistics team may be a travel cost (e.g., in time or in distance). The travel cost may be calculated by determining a cost of traveling from a starting location to a task location. The cost may be a function of latitude and longitude coordinates corresponding to the starting location and latitude and longitude coordinates corresponding to the task location.

Thus, in one or more examples, the objective may be represented by Equation 1, shown below.

$$\min(\Sigma_{f\in F} mc_f * M_f + \Sigma_{e\in\varepsilon}\Sigma_{t\in T} zc_e * Z_{te}) \qquad \text{Eq. 1}$$

where f is representative of a driver who is a member of an internal logistics team; F is representative of a set of drivers who are members of the internal logistics team; mc is representative of a cost of traveling associated with driver f; $M_f$ is representative of a distance traveled by driver f; e is representative of an external logistics partner; $\varepsilon$ is representative of a set of external logistics partners; t is representative of a task; T is representative of a set of tasks, wherein the set of tasks may comprise pickup tasks and drop-off tasks; $zc_e$ is representative of a cost of assigning an external logistics partner e; and $Z_{te}$ is representative of whether a task t is matched to an external logistics partner e.

In one or more examples, the one or more decision variables may comprise a first decision variable to track tasks that are matched to a driver who is a member of an internal logistics team, a second decision variable to track tasks that are matched to a driver who is a member of an external logistics partner, and/or a third decision variable to track a distance traveled by a driver who is a member of the internal logistics team. In one or more examples, the one or more decision variables may be represented by Equations 2-4, shown below.

In one or more examples, the first decision variable, $X_{tf}$, may be represented by Equation 2.

$$X_{tf}\in\{0,1\}\forall t\in T_f \in F \qquad \text{Eq. 2}$$

where in addition to the description with respect to Equation 1, $X_{tf}$ is representative of whether task t is serviced by driver f, wherein $X_{tf}$ is equal to 1 if and only if task t is serviced by driver f; and $T_f$ is representative of a set of tasks that may be completed by driver f, wherein a specific task may be excluded from $T_f$ for a number of reasons (e.g., the driver's ability does not overlap with a time window for the task; there may be a request for the driver not to complete the task; and/or there may be a request that a different driver must complete the task).

In one or more examples, the second decision variable, $Z_{te}$, may be represented by Equation 3.

$$Z_{te}\in\{0,1\}\forall t\in T_e \in \varepsilon \qquad \text{Eq. 3}$$

where in addition to the description with respect to Equations 1-2, $Z_{te}$ is representative of whether task t is serviced by driver f, wherein $Z_{te}$ is equal to 1 if and only if task t is serviced by an external logistics partner e; $T_e$ is representative of a set of tasks that may be completed by external logistics partner e, wherein a specific task may be excluded from $T_e$ for a number of reasons (e.g., there may be a request that the task cannot be completed by an external logistics partner (e.g., such that a household recipient is not served by DoorDash) or there may be a request that the task be completed by a different external logistics partner); and $\varepsilon$ is representative of a set of external logistics partners, wherein each element of the set is representative of an external logistics partner (e.g., DoorDash). An external logistics partner e may differ from a driver f who is a member of an internal logistics team in that (1) the external logistics partner does not have availability constraints, and (2) as discussed above, the cost of the external logistics partner may be calculated based on a number of tasks completed rather than a travel distance or time.

In one or more examples, the third decision variable, $M_f$, may be represented by Equation 4.

$$M_f\in[0,\infty]\forall f\in F \qquad \text{Eq. 4}$$

where, as described with respect to Equation 1, $M_f$ is representative of a distance traveled by driver f; and F is representative of a set of drivers who are members of the internal logistics team.

In one or more examples, the one or more constraints may comprise a first constraint that each task must be completed (e.g., by a driver who is a member of an internal logistics team or by a driver who is a member of an external logistics partner); a second constraint that a quantity of tasks a driver who is a member of an internal logistics team can complete is limited by the driver's available hours and completion rate; a third constraint that if a driver who is a member of an internal logistics team serves a task, a distance the driver travels from a home location associated with the driver to the task must be included when determining a total distance traveled by the driver; a fourth constraint that a supply picked up by a driver who is a member of an internal logistics team or a driver who is a member of an external organization can exceed a demand that the driver is expected to serve by no more than a predefined amount; a fifth constraint that a supply picked up by a driver who is a member of an internal logistics team or a driver who is a member of an external organization can fall below a demand that the driver is expected to serve by no more than a predefined amount; a sixth constraint that if one task in a task group is matched to a driver, all tasks in the task group must be matched to the driver; a seventh constraint that if a driver serves at least one donor, the driver must serve at least one recipient; and/or an eighth constraint that if a driver serves at least one recipient, the driver must serve at least one donor. In one or more examples, the seventh constraint and the eighth constraint may be redundant and unnecessary if a constraint specifying that supply must equal demand is enforced. In one or more examples, the one or more constraints may be represented by Equations 5-12, shown below.

In one or more examples, the first constraint may be represented by Equation 5.

$$\sum_{e\in E_t}z_{te}+\sum_{f\in F_t}X_{tf}\geq 1\forall t\in T \qquad \text{Eq. 5}$$

where in addition to the description with respect to Equations 1-4, $E_t$ is representative of a set of external logistics partners that may complete task t, wherein the set of external logistics partners that may complete the task may be limited for a number of reasons (e.g., those described with respect to $T_e$ of Equation 3); and $F_t$ is representative of a set of drivers who are members of an internal logistics team who may complete task t, wherein the set of drivers may be limited for a number of reasons (e.g., those described with respect to $T_f$ of Equation 2).

In one or more examples, the second constraint may be represented by Equation 6.

$$\sum_{t\in T_f}x_{tf}\leq h_f{}^*r\forall f\in F \qquad \text{Eq. 6}$$

where in addition to the description with respect to Equations 1-5, $h_f$ is representative of hours worked by driver f; and r is representative of a task completion rate (e.g., a quantity of tasks that may be completed per hour by a single driver).

In one or more examples, the third constraint may be represented by Equation 7.

$$M_f\geq\sum_{t\in T_f}c_{tsf}{}^*x_{tf}\forall f\in F \qquad \text{Eq. 7}$$

where in addition to the description with respect to Equations 1-6, $c_{tsf}$ is representative of a travel cost from a starting location $s_f$ associated with driver f to task t, wherein the travel cost is a function of the latitude and longitude coordinated corresponding to the starting location and the latitude and longitude coordinates corresponding to the task.

In one or more examples, the fourth constraint may be represented by Equation 8.

$$\sum_{t\in T_f}x_{tf}{}^*sd_t\leq se\forall f\in F;\sum_{t\in T_f}z_{te}{}^*sd_t\leq se\forall e\in\varepsilon \qquad \text{Eq. 8}$$

where in addition to those variables described with respect to Equations 1-7, $sd_t$ is representative of a supply or demand in units of food for a task t, wherein $sd_t$ is a positive value equal to the number of units of food if the task is a pickup task to pick up food from a donor and a negative value equal to $-1$ times the number of units of food if the task is a drop-off task to drop-off food at a recipient; and se is an acceptable supply excess for a single driver's tasks, wherein if a driver picks up do units of food and drops off re units of food, do–re must be less than or equal to se.

In one or more examples, the fifth constraint may be represented by Equation 9.

$$\sum_{t\in T_f}x_{tf}{}^*sd_t\geq-1{}^*ss\forall f\in F;\sum_{t\in T_f}z_{te}{}^*sd_t\geq-1{}^*ss\forall e\in\varepsilon \qquad \text{Eq. 9}$$

where in addition to those variables described with respect to Equations 1-8, ss is an acceptable supply shortage for a single driver's tasks, wherein if a driver picks up do units of food and drops off re units of food, re–do must be less than or equal to ss.

In one or more examples, the sixth constraint may be represented by Equation 10.

$$X_{tf}\leq X_{t_{next(i)}f}\forall f\in F\forall i\in[|T_g|]\forall g\in G$$

$$Z_{t_ie}\leq Z_{t_{next(i)}e}\forall e\in\varepsilon\forall i\in[|T_g|]\forall g\in G \qquad \text{Eq. 10}$$

where next(i)=i+1 if i<$|T_g|$ and next(i)=1 if i=$|T_g|$
where in addition to those variables described with respect to Equations 1-9, $T_g$ is representative of a set of task groups; g is representative of a task group; and G is representative of a total number of task groups.

In one or more examples, the seventh constraint may be represented by Equation 11.

$$\sum_{t\in T_f\cap D}x_{tf}\leq\sum_{t\in T_f\cap R}x_{tf}{}^*|T_f\cap D|\forall f\in F$$

$$\sum_{t\in T_e\cap D}Z_{te}\leq\sum_{t\in T_e\cap R}Z_{te}{}^*|T_e\cap D|\forall e\in\varepsilon \qquad \text{Eq. 11}$$

where in addition to those variables described with respect to Equations 1-10, D is representative of a set of all donors; and R is representative of a set of all recipients.

In one or more examples, the eighth constraint may be represented by Equation 12.

$$\sum_{t\in T_f\cap R}x_{tf}\leq\sum_{t\in T_f\cap D}x_{tf}{}^*|T_f\cap R|\forall f\in F$$

$$\sum_{t\in T_e\cap R}Z_{te}\leq\sum_{t\in T_e\cap D}Z_{te}{}^*|T_e\cap R|\forall e\in\varepsilon \qquad \text{Eq. 12}$$

As described above, in one or more examples, the seventh and eighth constraints may be unnecessary (e.g., if se=ss=0).

While the objective, the one or more decision variables, and the one or more constraints have been described with respect to specific equations, the equations included herein are exemplary. Any one or more of the equations may be modified.

At step 208, in one or more examples, a next step of applying the optimization process may be solving the optimization process. As described above, the optimization process may be a linear program. Once formulated, a linear program may simply be solved using a known technique (e.g., the Simplex method) by using a publicly available solver (e.g., Gurobi). When solved, the linear program described herein may generate an optimal driver-task match based on a cost minimization objective. The optimal driver-task match may automatically be determined based on an optimal solution of the linear program. Moreover, based on the data provided to the linear program, the linear program may simultaneously generate a plurality of optimal driver-task matches when solved. For example, the linear program may simultaneously generate a plurality of optimal driver-task matches for a particular zone, representative of a zone, for a particular day.

At step 210, in one or more examples, whether the optimization process has solved successfully may be determined. In one or more examples, it may be determined that the optimization process has solved successfully if no exceptions are raised when applying the optimization process. In one or more examples, it may be determined that the optimization process has not solved successfully if at least one exception is raised when applying the optimization process. An exception may be raised for a number of reasons. In the examples described above in which the optimization process is a linear program, an exception may be raised due to improper formulation of the linear program. In one or more examples, an infeasibility exception may be raised to indicate that the linear program is infeasible. In one or more examples, an unboundedness exception may be raised to indicate that the linear program is unbounded.

At step 212, in one or more examples, in accordance with a determination that the optimization process has solved successfully, an optimal driver-task match may be generated based on the optimization process. As described with respect to step 208, in one or more examples, the optimal driver-task match may be generated based on a cost minimization objective. Moreover, a plurality of driver-task matches may simultaneously be generated for a particular zone and for a particular day such that a total cost associated with all matches for the zone and for the day is minimized. In one or more examples, generating the optimal driver-task match (es) may comprise converting output of the optimization process to a format that may be output and returned to a user (e.g., the user associated with administrator 102d of FIG. 1).

At step 214, in one or more examples, in accordance with a determination that the optimization process has not solved successfully, a driver-task match may be generated based on matching a preferred driver to a task. The preferred driver may be a preferred driver for a zone for which a user would like to generate driver-task matches. In one or more examples, matches may be generated daily for the zone by assigning each task associated with the zone to the preferred driver. In one or more examples, reverting to this default method to generate driver-task matches, in which tasks may automatically be matched to a preferred driver associated with a zone, may be advantageous to ensure that each task may be matched to a driver even if the optimization process cannot be solved successfully. The examples provided above are meant as examples, and at step 214 other methods for matching a driver to a task could be employed when an optimization process has not solved successfully.

Turning back to FIG. 1, in one or more examples, one or more of the stored data sets described with respect to data storage units 106a-c may be modified upon applying the matching process. For example, the match data set may be modified by adding an entity for each match generated by applying the optimization process. Each of the added entities may be associated with a "process level" confirmation level, indicating that the match has been generated automatically by the matching process but that a task represented by the match has not yet been assigned to a driver.

In one or more examples, a visualization of a generated driver-task match may be generated and displayed. In one or more examples, a visualization may be generated for each driver-task match automatically generated by applying the matching process. Thus, in one or more examples, a plurality of visualizations, each representative of a driver-task match automatically generated by applying the matching for a selected zone and a selected day, may be simultaneously displayed. The plurality of visualizations may be simultaneously displayed to a user (e.g., the user associated with administrator 102d) via a graphical user interface (e.g., the graphical user interface described with respect to graphical user interface unit 104). This may be advantageous at least so that the administrator may provide one or more user inputs to manage the automatically generated driver-task matches. In one or more examples, a visualization of a driver-task match may be generated by interfacing with one or more APIs. In one or more examples, a visualization of a driver-task match may be generated automatically upon generating the driver-task match. Thus, display of the graphical user interface may be modified dynamically as driver-task matches are generated.

In one or more examples, once a driver is matched to a task, a driver-task assignment may be generated based at least in part on the match. As will be discussed further with respect FIGS. 5A-B, in one or more examples, assignment unit 110 may be configured to generate the driver-task assignment in response to one or more user inputs. For example, an administrator (e.g., the user associated with administrator 102d) may provide an input to confirm or override a generated match. Similarly, once assigned to a task, a driver (e.g., the user associated with driver 102c) may provide an input to accept or reject the assigned task. Additionally, even after a task has been assigned to a driver and has been accepted by the driver, a donor (e.g., the user associated with donor 102a), a recipient (e.g., the user associated with recipient 102b), or an administrator (e.g., the user associated with administrator 102d) may cancel an assigned task. Thus, driver-task assignments may be flexibly generated and modified in accordance with the one or more user inputs.

As discussed above, in one or more examples, a user (e.g., the user associated with administrator 102d) may provide one or more inputs to assign a task to a driver. In one or more examples, the one or more user inputs may comprise (1) confirming a driver-task match automatically generated by the matching process by confirming the driver assigned to the task; (2) overriding a driver-task match automatically generated by the matching process by selecting a different driver to assign to the task; and/or (3) providing a reason for assignment. It may be advantageous to manually provide user inputs to assign tasks in this manner at least to ensure that each task is completed.

In one or more examples, in accordance with the one or more user inputs, a driver-task assignment may be generated. The driver-task assignment may be generated by first determining whether the task that the user is requesting to be assigned has previously been assigned and/or completed. Whether the task has previously been assigned and/or completed may be determined automatically (e.g., by checking a status of the task gleaned from a stored data set (e.g., the task data set)). Determining whether the task has previously been assigned and/or completed may be important at least to ensure that no time and/or money is wasted by assigning a driver to a task that does not require assignment. In one or more examples, in accordance with a determination that the task has been previously assigned and/or completed, an error may be raised indicating that the task may not be reassigned. In one or more examples, in accordance with a determination that the task has not been previously assigned and/or completed, an assignment for the task may be generated based on the user inputs received (e.g., assigning the driver automatically matched to the task in response to a confirmation received by the user or assigning the driver manually matched to the task in response to an override received by the user). In one or more examples, an assignment reason may be associated with the generated assignment.

While described with respect to assigning one task, it is to be understood that each task may be similarly assigned. Moreover, while described with respect to assigning one task at a time, in one or more examples, a plurality of tasks may be simultaneously assigned.

In one or more examples, one or more of the stored data sets described with respect to data storage units 106a-c may be modified upon generating the assignment. For example, the match data set may be modified by adding an entity for each assignment generated. Each of the added entities may be associated with an "operations level" confirmation level, indicating that a task represented by the match has been assigned to a driver. In one or more examples, the confirmation level can indicate who is making the assignment, for instance if the assignment has been made manually (by an operator), automatically (by an algorithm), or whether the assignment was made by a driver. Thus, as described above, the match data set may comprise a plurality of entities for the same driver-task pair, wherein a first entity of the plurality of entities is associated with a different confirmation level than is a second entity of the plurality of entities.

In one or more examples, a visualization of the generated driver-task assignment may be generated and displayed. In one or more examples, a generated visualization of an assigned task may comprise (1) a visualization of data (e.g., a status of the task, a scheduled time to complete the task, an organization for whom the task is being completed, location information for the task, a quantity of food included in the task, driver information (e.g., a driver name and/or contact information), and/or comments associated with the task) pertaining to the task; and/or (2) a visualization of a location of the task on a map. In one or more examples, a visualization may be generated for each driver-task assignment generated. In one or more examples, each visualization generated may be displayed on a graphical user interface (e.g., the graphical user interface generated by graphical user interface unit 104). Thus, in one or more examples, a plurality of visualizations, each representative of a driver-task match generated for a selected zone for a selected day, may be simultaneously displayed. The plurality of visualizations may be simultaneously displayed to one or more users associated with system 100. For example, the plurality of visualizations may be displayed to an administrator (e.g., the user associated with administrator 102d). Displaying the visualizations to the administrator may be important at least so that the administrator can monitor a status of each assigned task (e.g., in a task manager screen), as will be discussed further with respect to FIG. 5C. Moreover, a set of the plurality of visualizations associated with a driver may be displayed to the driver (e.g., the user associated with driver 102c). Displaying the visualizations to the driver may be important at least so that the driver can view each task assigned to them. In one or more examples, a visualization of a driver-task assignment may be generated by interfacing with one or more APIs. In one or more examples, a visualization of a driver-task assignment may be generated automatically upon generating the driver-task assignment. Thus, display of the graphical user interface may be modified dynamically as driver-task assignments are generated.

The above description has been described with respect to generating and displaying a driver-task assignment in accordance with one or more inputs received from an administrator. In one or more examples, before assigning a driver to a task, a confirmation input may be needed from the driver assigned to the task signifying that the driver has accepted the task. In one or more examples, one or more of the stored data sets described with respect to data storage units 106a-c may be modified upon receiving confirmation from the driver. For example, the match data set may be modified by adding an entity for each confirmation received. Each of the added entities may be associated with a "driver level" confirmation level, indicating that a task represented by the match has been assigned to a driver and accepted by the driver.

In one or more examples, after a task has been assigned to a driver, it may be unassigned for any number of reasons. For example, a driver may reject an assigned task (e.g., because the driver does not wish to travel to a particular location or because the driver does not wish to deliver a particular type of food). Moreover, a donor or a recipient may cancel a task before it is completed (e.g., because the donor has less leftover food than expected or because the recipient is in need of less food than expected). Similarly, an administrator may cancel a task for a driver (e.g., in response to a request from a donor, a recipient, or the driver to cancel the task).

In one or more examples, once a task is unassigned, display of the graphical user interface may be modified dynamically. A visualization corresponding to the unassigned task may be removed from the graphical user interface. Moreover, in one or more examples, once a task is unassigned, one or more of the stored data sets described with respect to data storage units 106a-c may be modified. For example, the match data set may be modified by deleting an entity associated with an "operations level" confirmation level for a driver-task pair corresponding to the unassigned task.

In one or more examples, in response to a request from a driver or an administrator to unassign a task, the task may be reassigned (e.g., according to the method described above with respect to generating an assignment in accordance with one or more user inputs). In one or more examples, in response to a request from a donor or a recipient to unassign a task, the task may not be reassigned.

FIGS. 3A-5C show exemplary graphical user interfaces associated with a system for delivering food from donors to recipients (e.g., system 100 of FIG. 1), according to one or more examples.

FIGS. 3A-F illustrate aspects of an exemplary user interface displayed to a donor associated with the system, according to one or more examples. In one or more examples, the donor may be a member of a donor organization. In one or more examples, access to the screens described with respect to FIGS. 3A-F may be restricted to members of the donor organization.

Figure 3A:
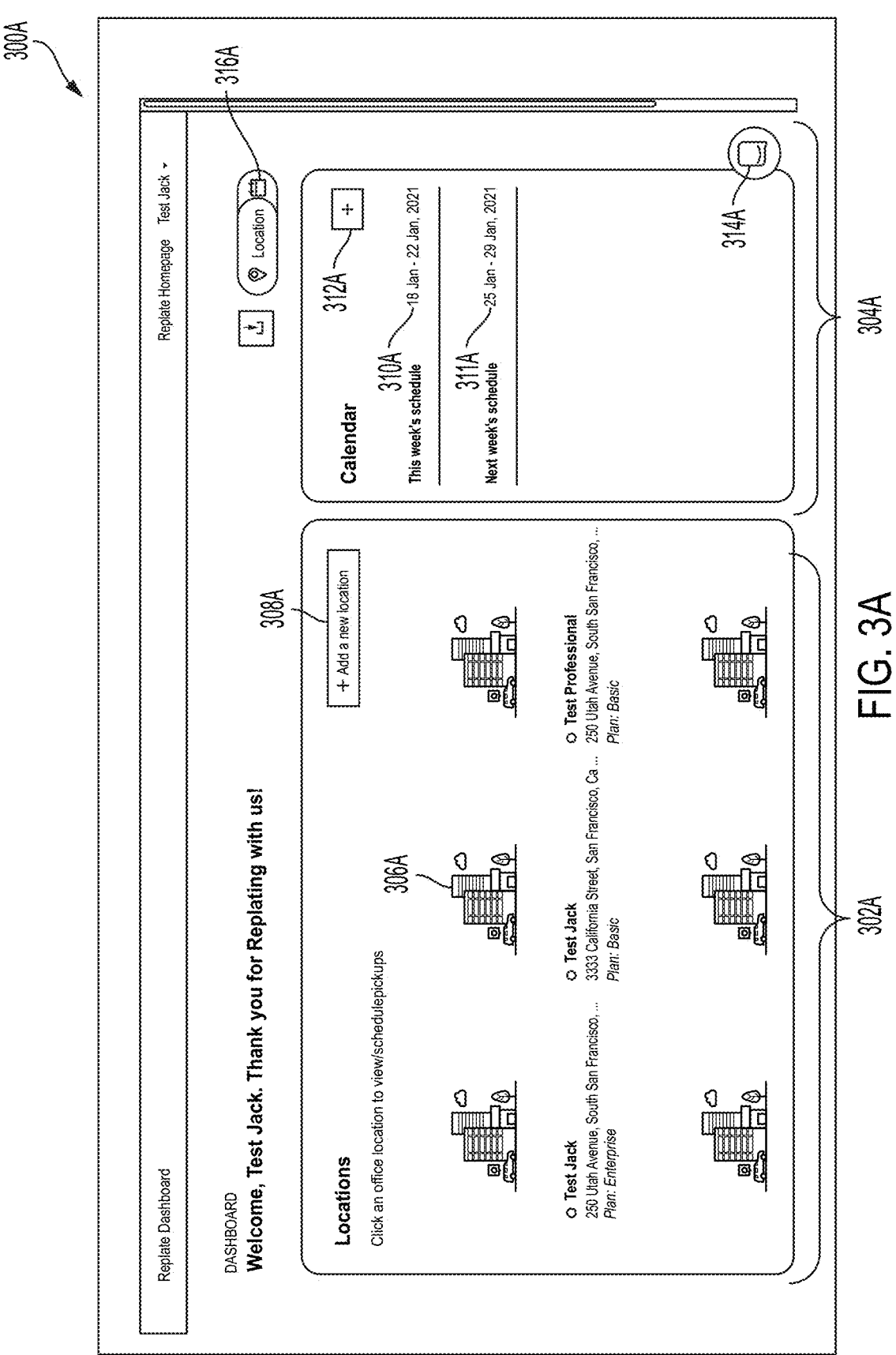
FIGS. 3A-F show aspects of an exemplary graphical user interface displayed to a donor associated with the system for delivering food from donors to recipients, according to one or more examples.

Screen 300A of the user interface, shown in FIG. 3A, may be a landing page for the donor. As shown in screen 300A, the user interface may include a location region 302a for viewing and/or managing a plurality of locations associated with the donor and a calendar region 304a for viewing and/or managing upcoming tasks associated with the donor.

In one or more examples, location region 302a may include a representation of a plurality of locations associated with the donor. For example, as shown in screen 300A, a first location may be represented by a graphical icon 306a and/or an associated description. In one or more examples, the associated description may comprise a name for the location (which may be specified by the donor) and/or an address of the location. In one or more examples, each location associated with the donor may be represented by a respective graphical icon and/or a respective description. Thus, in one or more examples, a donor may view and/or schedule tasks for a location other than a location at which the donor is physically present.

In one or more examples, a donor may select a location to view information about the selected location. For example, a donor may select graphical icon 306a to view information about the corresponding location. In one or more examples, in response to the donor selection of the location, screen 300C of FIG. 3C may be displayed.

In one or more examples, screen 300C of the user interface may display calendar information for the selected location. As shown in screen 300C, the calendar information may be shown in a calendar which displays information for all upcoming pickup tasks associated with the donor for a predetermined and/or user-determined period of time (e.g., a day, a week, a month, or a year). For example, task 318 may be displayed in the calendar. The donor may select a different period of time than one shown by default (e.g., by selecting arrow 319a and/or arrow 319b). In one or more examples, the upcoming pickup tasks displayed in the calendar may be those tasks scheduled by the donor. In other examples, the upcoming tasks displayed in the calendar may be those tasks scheduled by any member of the donor organization associated with the donor. It may be advantageous to only show those tasks scheduled by the donor at least because the donor may only be responsible for those tasks they have scheduled. It may be advantageous to show those tasks scheduled by any member of the donor organization at least because the donor may be responsible for managing all tasks scheduled by the donor organization.

In one or more examples, screen 300C of the user interface may additionally display a region in which any pickup tasks in progress are displayed. In one or more examples, a donor may select a pickup task in progress to display information pertaining to the pickup task. In one or more examples, in response to the donor selection of the in-progress pickup task, screen 300E of FIG. 3E may be displayed.

In one or more examples, screen 300E of the user interface may display an estimated-time-of-arrival tool 340 in which a donor may track a location of a driver assigned to an in-progress task. As shown in screen 300E, the user interface may comprise a map region 342 and a driver-task summary region 344. In one or more examples, the map region may be displayed by interfacing with one or more APIs configured to interface with any external software platform used to display location information in a map.

In one or more examples, a map of a geographic area in which the driver and the task are located may be displayed in map region 342. In one or more examples, an indication of a current location of the driver may be displayed in the map region. For example, a graphical icon 346 representing the driver is shown in screen 300E. In one or more examples, an indication of a address of the location may be displayed in the map region. For example, a graphical icon 348 representing a task is shown in screen 300E.

In one or more examples, driver-task summary information may be displayed in summary region 344. In one or more examples, the summary information may comprise a name and/or contact information of the driver assigned to the selected in-progress task, an address of the task location, and/or an estimated time of arrival of the driver.

While tool 340 has been described with respect to displaying information about one in-progress task, in one or more examples, tool 340 may simultaneously display information about a plurality of in-progress tasks. Thus, a donor may quickly and easily view information about more than one in-progress task.

Figure 3B:
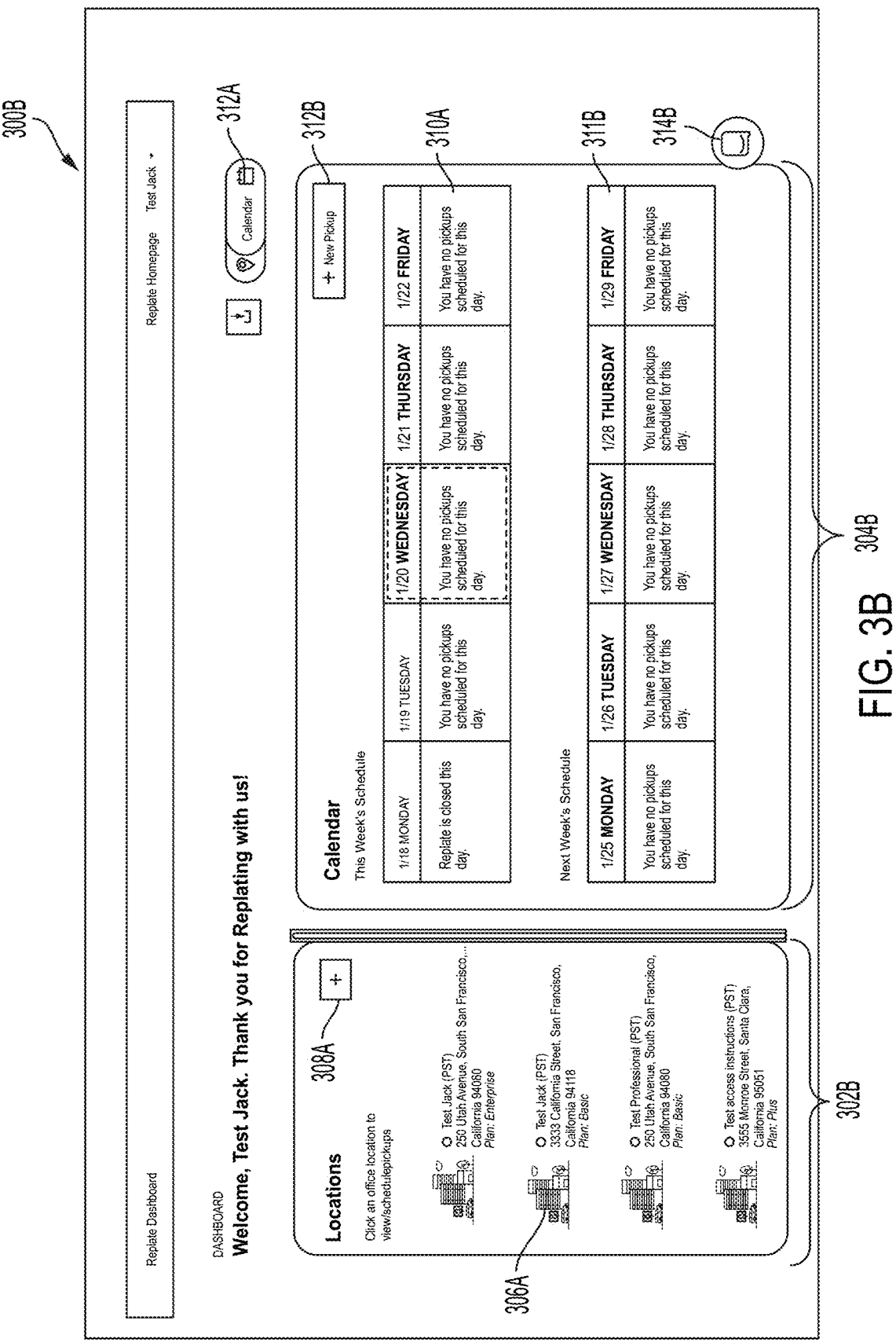
Figure 3C:
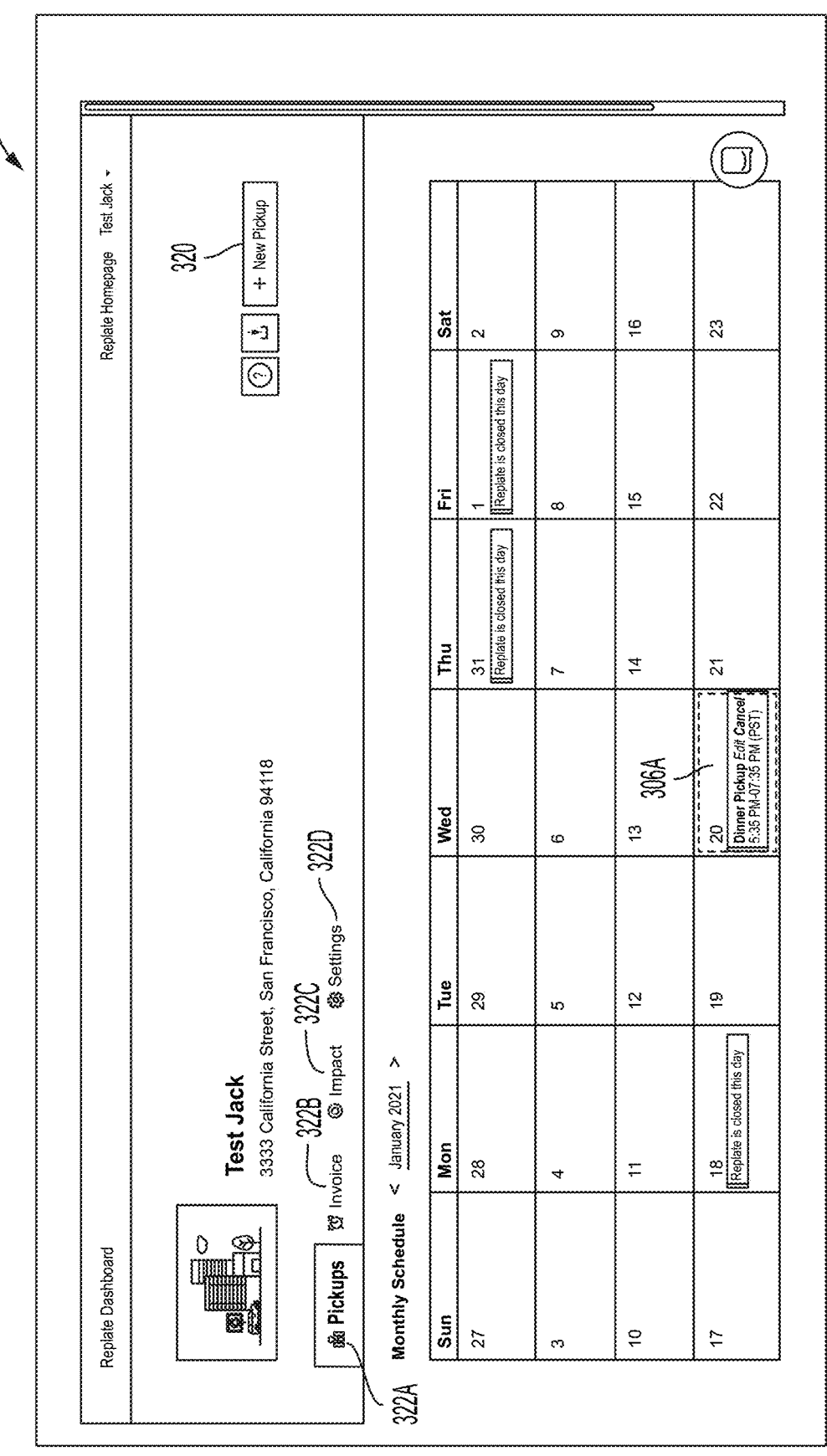
Figure 3D:
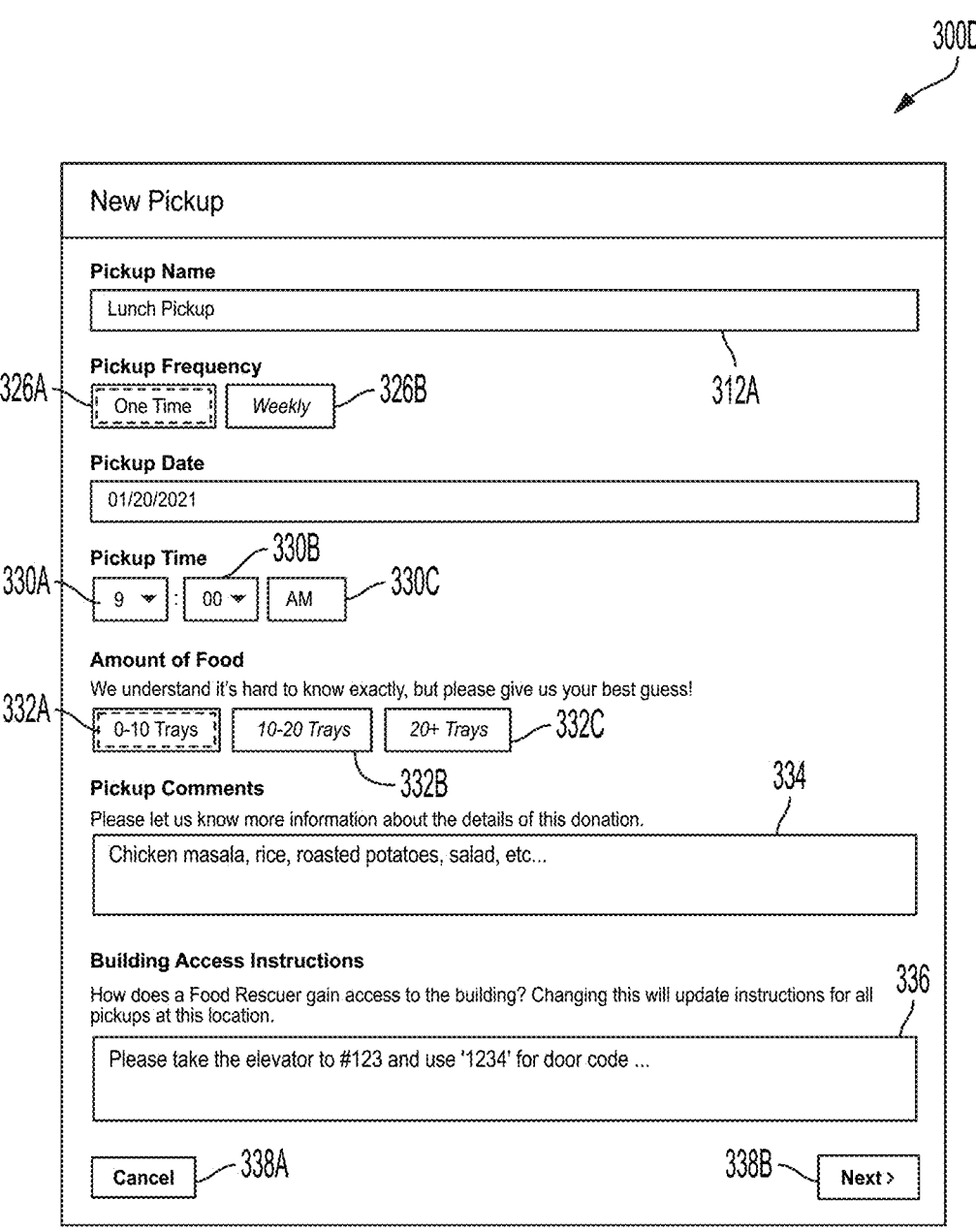
Figure 3E:
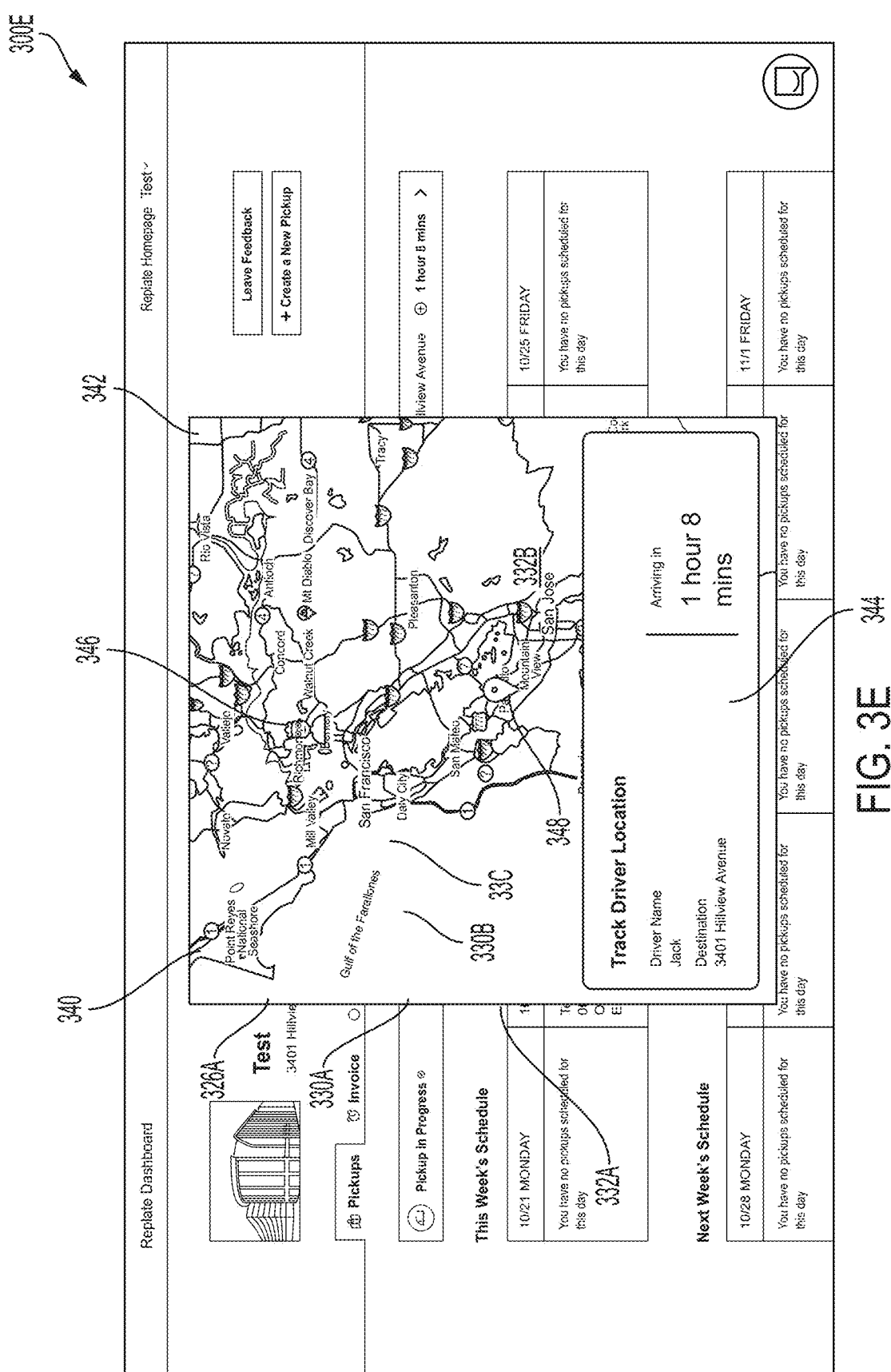
Figure 3F:
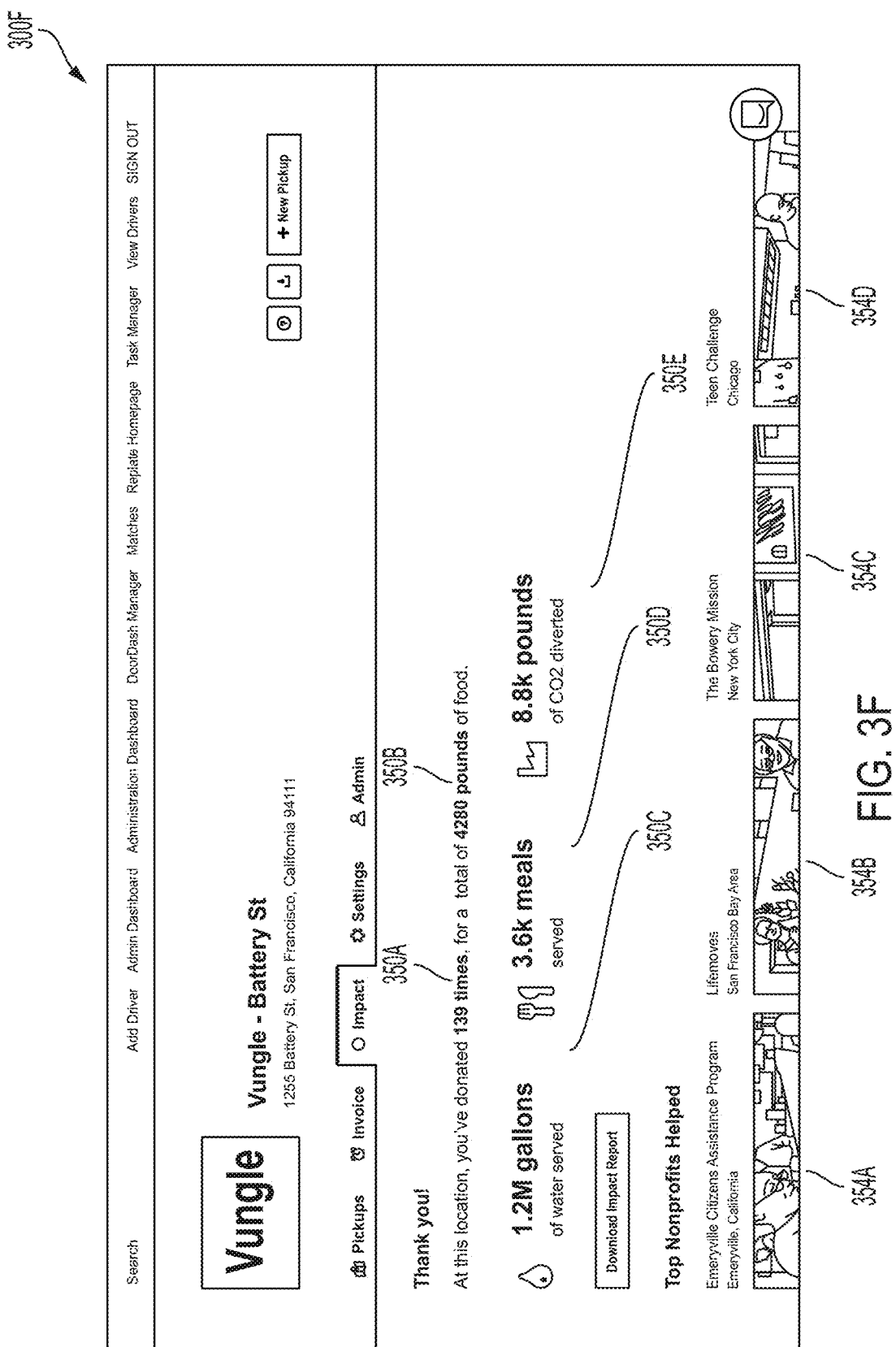

In one or more examples, as shown in FIG. 3E, tool 340 may be overlaid over a portion of the calendar for the selected location. To return to the view described with respect to FIG. 3C, a donor may select a portion of screen 300E in which the tool is not displayed.

Turning back to FIG. 3C, in one or more examples, a donor may schedule a new pickup task for the selected location. In one or more examples, the donor may schedule the new pickup task by selecting a user affordance for scheduling a new pickup task (e.g., button 320). In one or more examples, in response to the donor selection of the user affordance for scheduling a new pickup task, screen 300D of FIG. 3D may be displayed.

In one or more examples, screen 300D of the user interface may display a pickup task scheduler. In one or more examples, the pickup task scheduler may comprise one or more user affordances that enable a donor to specify one or more parameters associated with the new pickup task, cancel the new pickup task, and/or schedule the new pickup task. In one or more examples, the one or more parameters for the new pickup task may include a name, a pickup frequency, a pickup date, a pickup time (or window), a quantity of food, a pickup comment, and/or a building instruction. In one or more examples, the donor may specify the name by typing the name into data field 324. In one or more examples, the donor may specify the pickup frequency by selecting either button 326a (to indicate that the new pickup task is a one-time task) or button 326b (to indicate that the new pickup task is repeated weekly). In one or more examples, the donor may specify the pickup date by selecting a date from a plurality of dates displayed (e.g., in a calendar) upon selection of data field 328. In one or more examples, the donor may specify the pickup time by selecting an hour of the selected day in which to complete the task (e.g., by selecting an hour from a plurality of hours displayed upon selection of drop-down menu indicator 330a), a minute of the selected hour in which to complete the task (e.g., by selecting a minute from a plurality of minutes displayed upon selection of drop-down menu indicator 330a), and/or whether the selected hour is in AM or PM(. In one or more examples, the donor may specify the quantity of food by selecting either button 332a (to indicate that the quantity of food is approximately 0-10 trays), button 332b (to indicate that the quantity of food is approximately 10-20 trays), or button 332c (to indicate that the quantity of food is at least approximately 20 trays). In one or more examples, the donor may specify the pickup comment by typing the comment into data field 334. In one or more examples, the donor may specify the building access instruction by typing the instruction into data field 336. In one or more examples, the donor may close the modal by selecting a user affordance for canceling the new pickup task (e.g., button 338a). In one or more examples, the donor may schedule the new pickup task by selecting a user affordance for scheduling the new pickup task (e.g., button 338b). In one or more examples, in response to selection of either button 338a or button 338b, screen 300C of FIG. 3C may again be displayed.

Turning back to FIG. 3C, in one or more examples, in addition to viewing and/or modifying calendar information for the selected location, a donor may desire to view and/or modify invoice information, impact information, and/or settings for the selected location. In one or more examples, the donor may rapidly switch what information is displayed in the user interface by selecting a different one of tabs 322a (which may be selected to view and/or modify calendar information), 322b (which may be selected to view and/or modify invoice information), 322c (which may be selected to view and/or modify impact information), and 322d (which may be selected to view and/or modify settings). FIG. 3C is shown in accordance with selection of tab 322a. In one or more examples, in response to selection of tab 322c, screen 300F of FIG. 3F may be displayed.

In one or more examples, screen 300F of the user interface may display a donor impact page. In one or more examples, the donor impact page may display summary information about donations associated with a donor and/or a donor organization with which the donor is associated. It may be advantageous to display the summary information at least to demonstrate to stakeholders a quantifiable impact of completed donations. In one or more examples, the summary information may comprise information about a number of donations (indicated by text string 350a), a quantity of food donated (indicated by text string 350b), a quantity of water saved (indicated by text string 350c and the associated graphical icon of a water droplet), a quantity of meals served (indicated by text string 350*d* and the associated graphical icon of silverware), and/or a quantity of carbon dioxide diverted (indicated by text string 350*e* and the associated graphical icon of a factory). In one or more examples, the summary information may additionally comprise information about the top nonprofits helped. In one or more examples, a name, a location, and/or an image associated with the top nonprofits helped may be displayed in screen 300F. For example, image 354*a* is displayed for nonprofit "Emeryville Citizens Assistance Program," located in Emeryville, CA; image 354*b* is displayed for nonprofit "Lifemoves," located in the San Francisco Bay Area; image 354*c* is displayed for nonprofit "The Bowery Mission," located in New York City; and image 354*d* is displayed for nonprofit "Teen Challenge," located in Chicago. In one or more examples, the summary information may be downloaded (e.g., by selecting button 352). The downloaded summary information may be formatted in an impact report, which may then be shared with stakeholders.

In one or more examples, once a donor has finished viewing and/or modifying information for the selected location, screen 300A of FIG. 3A may again be displayed in the user interface.

Turning back to FIG. 3A, in one or more examples, location region 302 may include a user affordance for adding a new location. In one or more examples, a donor may select the user affordance (e.g., button 308*a*) because the donor would like to add another location to the system for delivering food from donors to recipients (e.g., system 100). The location may be associated with a donor organization but the location may not have previously donated. In other examples, the donor may select the user affordance because the donor would like to display a location associated with the donor organization in the system for delivering food from donors to recipients but not currently displayed (e.g., the donor organization may be associated with more locations than can reasonably be displayed at once). In one or more examples, the new location may be displayed in the location region upon being added.

In one or more examples, calendar region 304*a* may include a representation of upcoming tasks associated with the locations displayed in location region 302*a*. In one or more examples, the calendar region may include a representation of upcoming tasks for a user-defined and/or predefined time period. For example, as shown in FIG. 3A, the calendar region may include a representation of upcoming tasks for two weeks. Upcoming tasks may be grouped by week, such that a first set of tasks are grouped in a first week (indicated by a portion of the calendar region that corresponds to the week indicated by text string 310*a*) and a second group of tasks are grouped in a second week (indicated by a portion of the calendar region that corresponds to the week indicated by text string 311*a*).

In one or more examples, calendar region 304*a* may additionally include a user affordance for scheduling a new pickup task. For example, a donor may select button 312*a* to schedule a new pickup task. In one or more examples, upon selection of the user affordance for scheduling a new pickup task, screen 300D of FIG. 3D may be displayed (e.g., after the donor specifies a location for the new pickup task). Thus, a donor may be able to select either user affordance 316*a* of FIG. 3A or user affordance 320 of FIG. 3C to schedule a new pickup task.

In one or more examples, screen 300A may comprise a user affordance for accessing a chat platform. For example, a donor may select button 314 to access a chat platform. The chat platform may be any chat platform capable of transmitting chat communications between at least two users in real-time. It may be advantageous to provide access to a chat platform at least so that the donor may receive support (e.g., from an administrator) in real-time.

In one or more examples, screen 300A may represent a first exemplary landing page for a donor. In one or more examples, screen 300A may represent a "location view" for the landing page, in which locations associated with the donor are emphasized more than are tasks associated with the donor (as represented by the relative sizes of location region 302*a* and calendar region 304*a*). Emphasizing the locations more than the tasks may be advantageous at least to enable a donor to more quickly and easily view, modify, and/or select one or more locations. However, in one or more examples, a donor may prefer to emphasize tasks associated with the donor more than are locations associated with the donor. Emphasizing the tasks more than the locations may be advantageous at least to enable a donor to more quickly and easily view, modify, and/or select one or more tasks. In one or more examples, to switch from the "location view" to a "calendar view," in which tasks associated with the donor are emphasized more than are locations associated with the donor, the donor may select a user affordance for switching the view. For example, the donor may select button 316*a*, which may be a toggle button that is capable of switching back and forth between the "location view" and the "calendar view" settings. In one or more examples, in response to selection of the user affordance for switching the view, screen 300B of FIG. 3B may be displayed.

In one or more examples, screen 300B may represent a second exemplary landing page for a donor. As represented by the relative sizes of location region 302*b* and calendar region 304*b*, tasks associated with the donor are more emphasized than are locations associated with the donor. Subsequently, the size and location of one or more other elements displayed in the user interface are modified compared to screen 300A. As shown in FIGS. 3A and 3B, the location and size of graphical icon 306*b* differ from the location and size of corresponding graphical icon 306*a*, the location and size of button 308*b* differ from the location and size of corresponding button 308A, the location and size of the portion of calendar region 304*b* that corresponds to the week indicated by text string 310*b* differ from the location and size of the corresponding portion of calendar region 304*a* that corresponds to the week indicated by text string 310*a*, the location and size of the portion of calendar region 304*b* that corresponds to the week indicated by text string 311*b* differ from the location and size of the corresponding portion of calendar region 304*a* that corresponds to the week indicated by text string 311*a*, and the location and size of button 312*b* differ from the location and size of corresponding button 312*a*. However, the display of one or more other elements displayed in the user interface may remain the same. As shown in FIGS. 3A and 3B, the location and size of button 314*b* are the same as those of corresponding button 314*a*, and the location and size of button 316*b* are the same as those of corresponding button 316*a*. Regardless of whether the display of an element is modified when switching from the "location view" to the "calendar view," each element shown in FIG. 3B may display similar (or the same information) and/or function in the same manner as the corresponding element described with respect to FIG. 3A (e.g., such that graphical icon 306*b* may be selected to view information about a location).

FIGS. 4A-E illustrate aspects of an exemplary user interface displayed to a recipient associated with the system for delivering food from donors to recipients, according to one or more examples. In one or more examples, the recipient may be a member of a recipient organization. In one or more examples, access to the screens described with respect to FIGS. 4A-E may be restricted to members of the recipient organization.

In one or more examples, counterparts to many of the screens displayed to a donor (e.g., those screens described with respect to FIGS. 3A-F) may be displayed to a recipient.

Figure 4A:
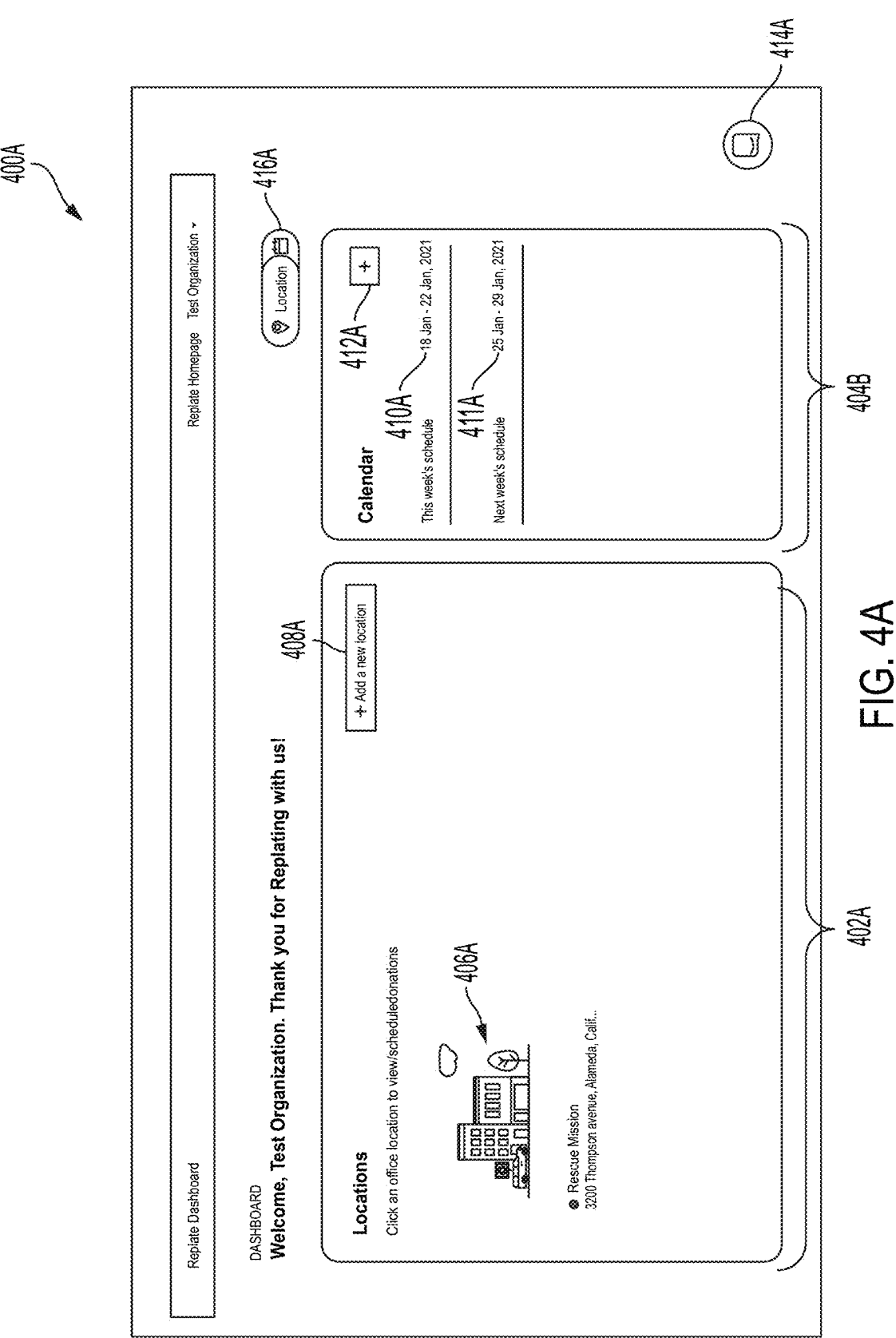
Figure 4B:
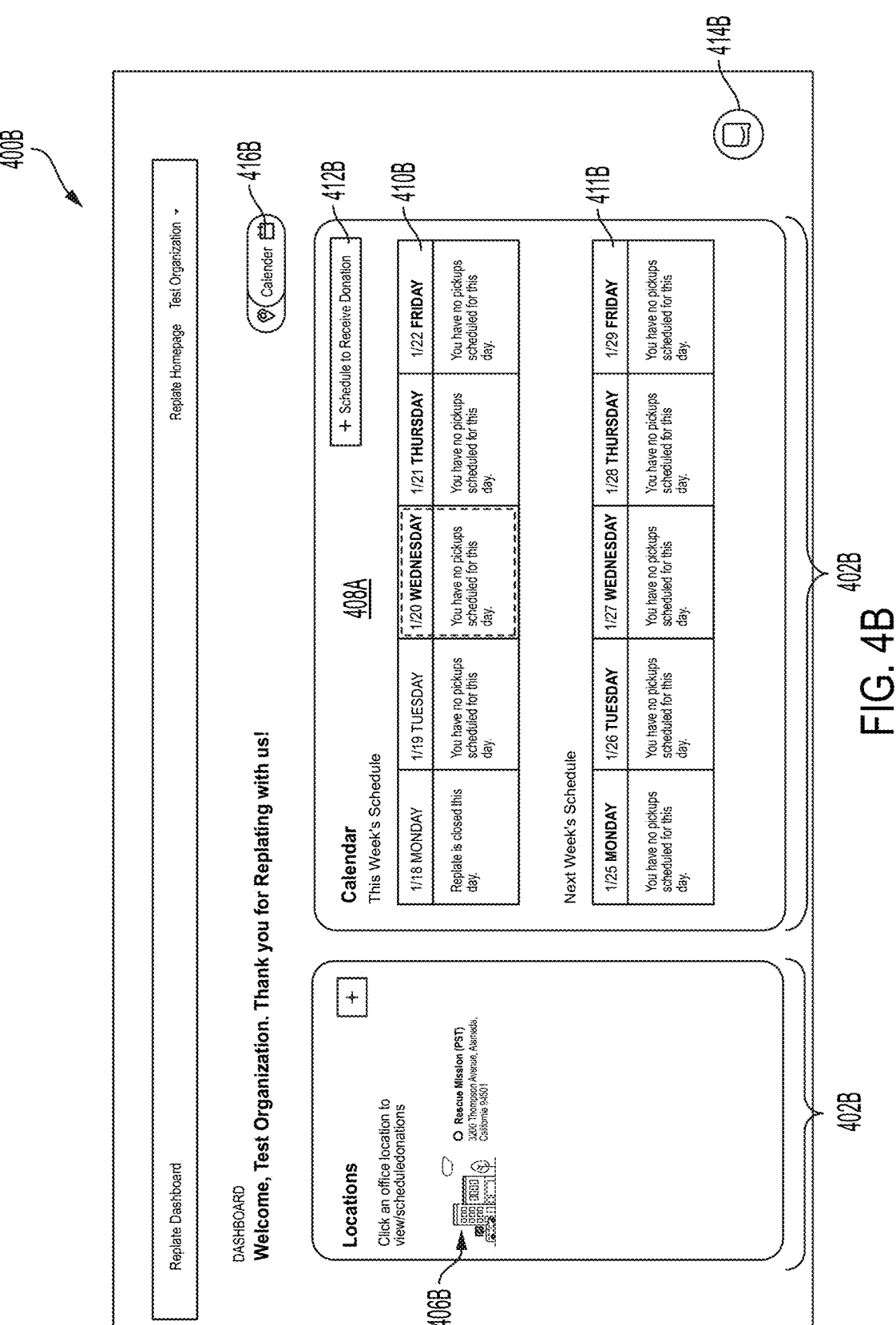

In one or more examples, screen 400A of the user interface may display a "location view" of a landing page for a recipient. In one or more examples, screen 400A of FIG. 4A may be a counterpart to screen 300A of FIG. 3A. As shown in FIG. 4A, screen 400A may comprise a location region (e.g., location region 402a) and a calendar region (e.g., calendar region 404a), a user affordance for selecting a location (e.g., graphical icon 406a), a user affordance for adding a new location (e.g., button 408a), a text string indicating a first week displayed in the calendar region string (e.g., text string 410a), a text indicating a second week displayed in the calendar region string (e.g., text string 411a), a user affordance for adding a new drop-off task (e.g., button 412a), a user affordance for accessing a chat platform (e.g., button 414a), and a user affordance for switching view of the screen (e.g., button 416a). Each of the elements of FIG. 4A may display similar (or the same) information and/or function in the same manner as the corresponding element described with respect to FIG. 3A.

In one or more examples, screen 400B of the user interface may display a "calendar view" of a landing page for a recipient. In one or more examples, screen 400B of FIG. 4B may be a counterpart to screen 300B of FIG. 3B. Each element of FIG. 4B (e.g., location region 402b, calendar region 404b, graphical icon 406b for selecting a location, button 408b for adding a location, text string 410b indicative of a first week displayed in the calendar region, text string 411b indicative of a second week displayed in the calendar region, button 412b for adding a drop-off task, button 414b for accessing a chat platform, and button 416b for switching view of the screen) may display similar (or the same) information and/or function in the same manner as the corresponding element described with respect to FIG. 3B.

Figure 4C:
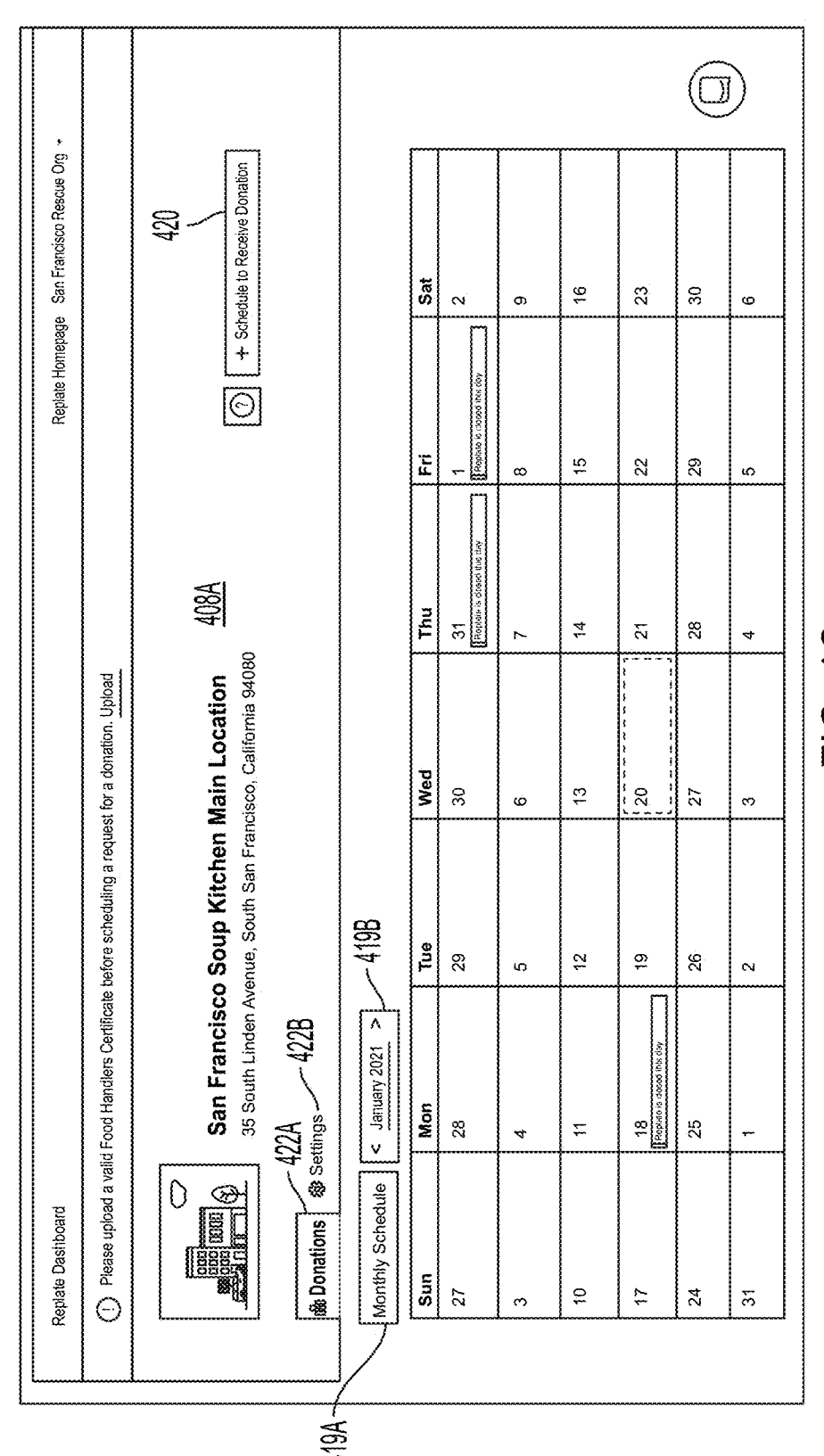

In one or more examples, screen 400C of the user interface may display calendar information for a selected location. In one or more examples, screen 400C of FIG. 4C may be a counterpart to screen 300C of FIG. 3C. In one or more examples, screen 400C may be displayed in response to a request from a recipient to select a location corresponding to graphical icon 406a of FIG. 4A or graphical icon 406b of FIG. 4B. As shown in FIG. 4C, information for all upcoming drop-off tasks associated with the recipient and the selected location may be displayed for a predetermined and/or user-determined period of time (e.g., a month). The recipient may select a different period of time than one shown by default (e.g., by selecting arrow 419a and/or arrow 419b). Moreover, the recipient may select a user affordance (e.g., button 420) for adding a drop-off task to the selected location. Further, while screen 400C is shown to display information for upcoming drop-off tasks (e.g., in accordance with selection of tab 422a), screen 400C may instead display information for settings associated with the selected location (e.g., in accordance with selection of tab 422b).

In one or more examples, screen 400D of the user interface may display a drop-off task scheduler. In one or more examples, screen 400D of FIG. 4D may be a counterpart to screen 300D of FIG. 3D. In one or more examples, screen 400D may be displayed in response to a request from a recipient to schedule a new drop-off task (e.g., in response to a selection of button 412a of FIG. 4A, button 412b of FIG. 4B, or button 420 of FIG. 4C). In one or more examples, the drop-off task scheduler may comprise one or more user affordances that enable a recipient to specify one or more parameters associated with the new drop-off task, cancel the new drop-off task, and/or schedule the new drop-off task. For example, the drop-off task scheduler may comprise data field 424 for specifying a drop-off task name; buttons 426a and 426b for specifying a drop-off task frequency; data field 428 for specifying a drop-off task date; drop-down menu icons 430a, 430b, 431a, and 431b, and buttons 430c and 431c for specifying a window of time; buttons 432a, 432b, 432c, and 432d for specifying a quantity of food; data field 434 for specifying a drop-off comment; data field 436 for specifying a building access instruction; button 438a for canceling the process of scheduling a received donation; and/or button 438b for scheduling a drop-off task.

Figure 4D:
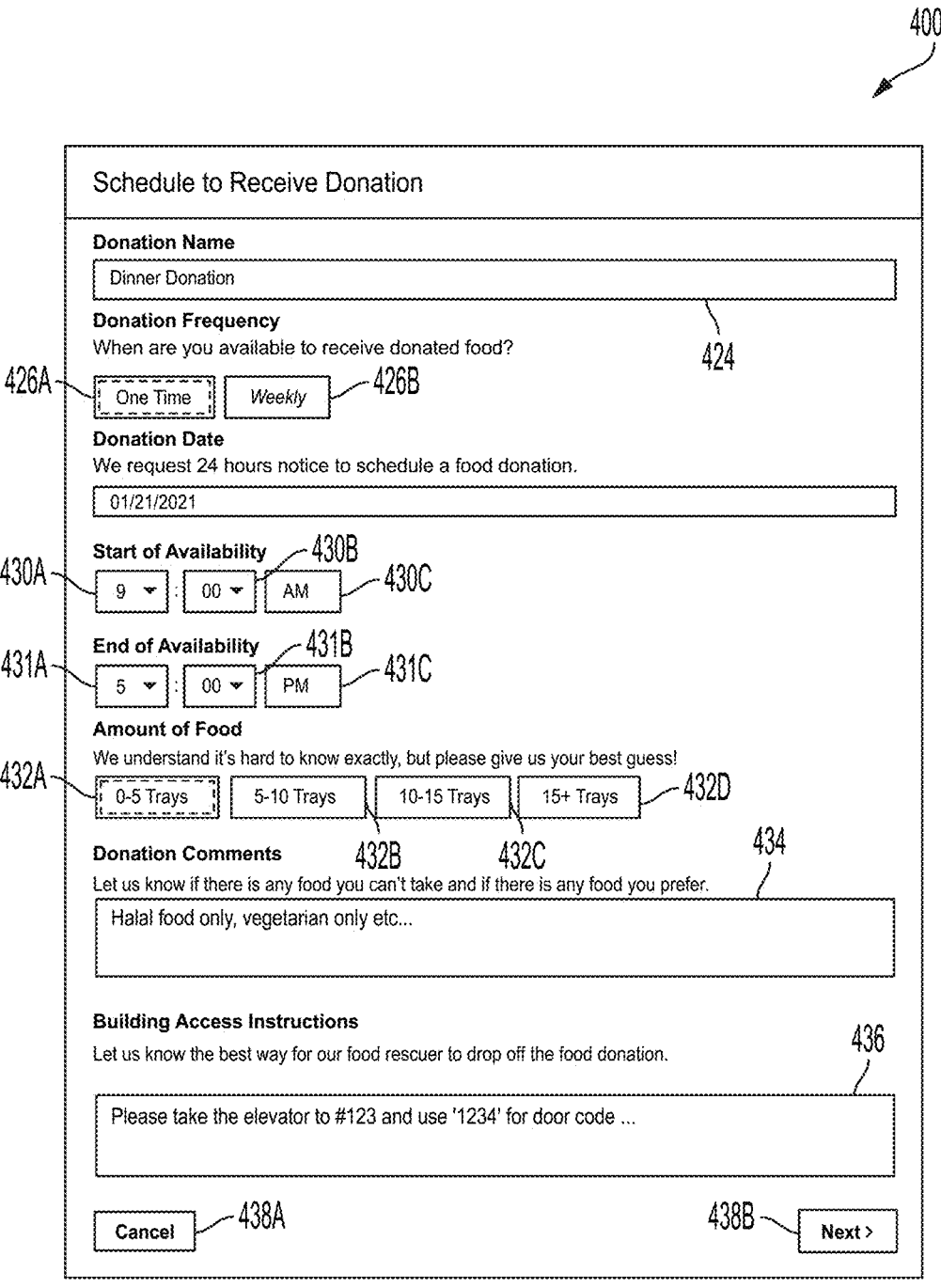

Thus, while similar to screen 300D of FIG. 3D in many respects, screen 400D of FIG. 4D may differ from screen 300D in several aspects. First, whereas scheduling a pickup task may comprise scheduling a time for the pickup task, scheduling a drop-off task may comprise scheduling a window of time for the drop-off task. Scheduling a window of time for the drop-off task may be advantageous at least to provide increased flexibility when matching the drop-off task to a driver. Second, whereas the quantity of food for a pickup task may be selected from 0-10 trays, 10-20 trays, and 20+ trays, the quantity of food for a drop-off task may be selected from 0-5 trays, 5-10 trays, 10-15 trays, and 15+ trays. By enabling a recipient to select a range as low as 0-5 trays, the recipient may request only the food that they require and food waste may be reduced. Third, whereas a comment associated with a pickup task may comprise a listing of the types of food being donated, a comment associated with a drop-off task may comprise a listing of food that a recipient cannot receive (e.g., due to food allergies and/or sensitivities), and/or a listing of food a recipient prefers to receive. By enabling a recipient to specify food preferences, liability associated with dropping off food at the recipient may be reduced. For instance, as an example, bringing non-perishables to a recipient that does not have refrigeration and heating capacity.

In one or more examples, screen 400E of the user interface may display a form in which to collect demographic information about a new location associated with a recipient. Collecting demographic information about the new location may be advantageous at least so that donors, drivers, and/or administrators know who they serve. In one or more examples, screen 400E may be displayed in response to a recipient selection to add a location (e.g., in response to a recipient selection of button 408a of FIG. 4A or button 408b of FIG. 4B). As shown in FIG. 4E, the demographic information collected may comprise information about one or more minority groups who receive food from the location. In one or more examples, the one or more minority groups may comprise a children (e.g., those under 18 years old) group, a seniors (e.g., those over 65 years old) group, a racial/ethnic minority group, a females group, an LGBTQ group, and/or an at risk of HIV/AIDS group.

In one or more examples, by default, no demographic information may be populated in the form. A recipient may select a user affordance to fill in demographic information. For example, to provide information about the children group, a recipient may select drop-down menu icon 440. Subsequently, a menu may be displayed in which the recipient may select an option indicating approximately correct data about the children who receive food from the location.

In one or more examples, the option may be selected from a plurality of options. In one or more examples, upon selecting the option, data indicated by the option may automatically be displayed in a data field associated with the drop-down menu icon (e.g., data field 441). Providing demographic information about each group may follow a similar process. Thus, to provide information about the seniors group, a recipient may select drop-down menu icon 442; to provide information about the racial/ethnic minority group, a recipient may select drop-down menu icon 444; to provide information about the females group, a recipient may select drop-down menu icon 446; to provide information about the LGBTQ group, a recipient may select drop-down menu icon 448; and to provide information about the at risk of HIV/AIDS group, a recipient may select drop-down menu icon 450. In one or more examples, filling in demographic information may be optional. Thus, the recipient may not provide information about a group (e.g., if the recipient does not wish to provide the information and/or does not know the information).

In one or more examples, alternatively to or in addition to being used to collect demographic information, the form displayed in screen 400E may be used to gather information about a number of meals required by the location per week. A recipient may provide information about the number of meals required by the location per week by typing the information into a data field (e.g., data field 452b). As indicated by asterisk 452a, the recipient may be required to provide the information about the number of meals required by the location per week. This information may be crucial to determine how to best allocate meals and/or drivers (and to determine whether enough meals are donated by donors to supply the required number of meals and/or whether enough drivers are available to deliver the required number of meals).

In one or more examples, the screens described with respect to FIGS. 3A-F and the screens described with respect to FIGS. 4A-E may follow a color scheme. In one or more examples, a color scheme for the screens shown in FIGS. 3A-F may be that certain elements are displayed with a green background and/or fill. In one or more examples, a color scheme for the screens shown in FIGS. 4A-E may be that certain elements are displayed with a blue background and/or fill. Thus, the screens may be color-coded based on whether a user is a donor or a recipient.

Figure 5A:
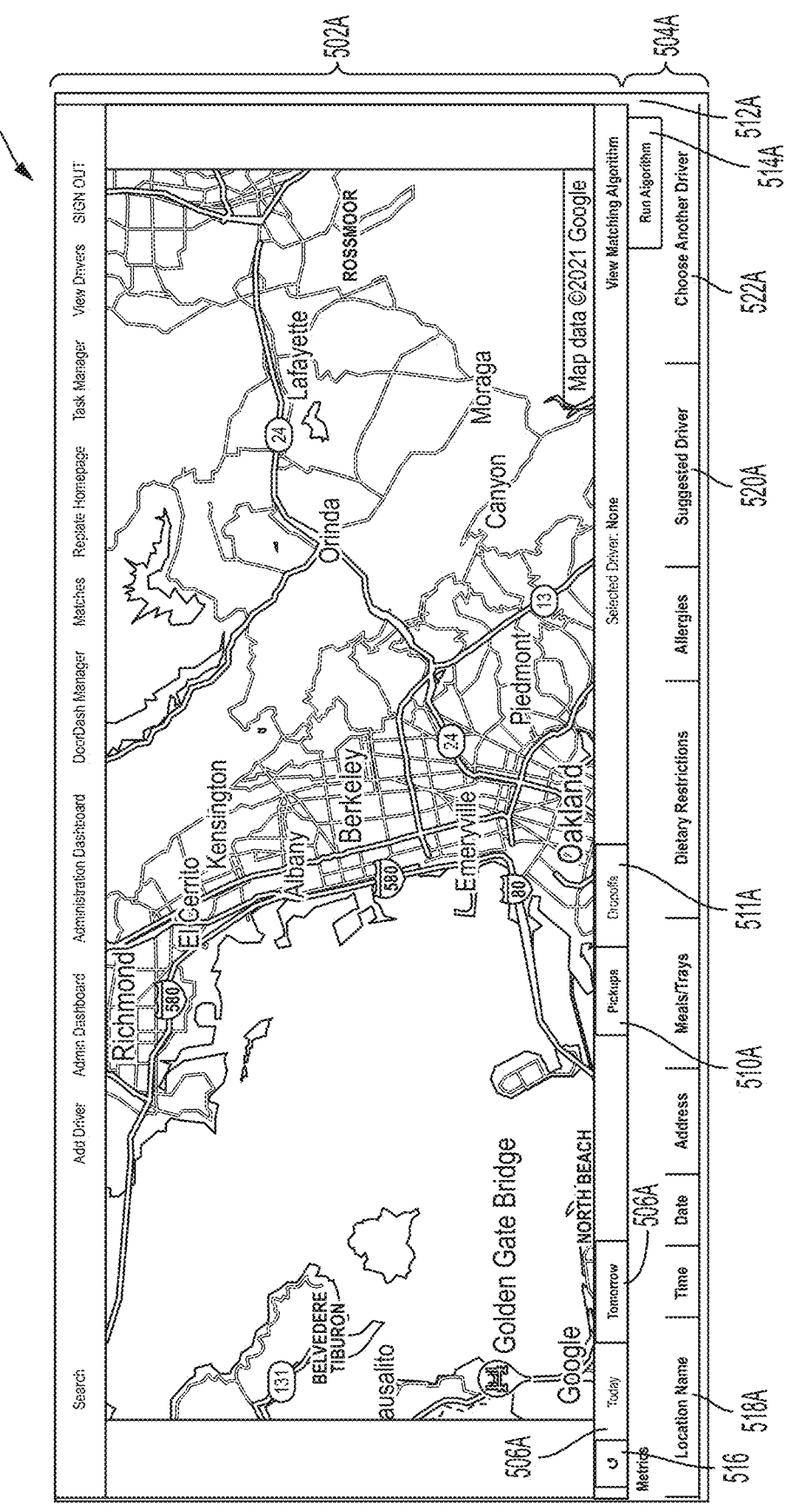
FIGS. 5A-C show aspects of an exemplary graphical user interface displayed to an administrator associated with the system for delivering food from donors to recipients, according to one or more examples.
Figure 5B:
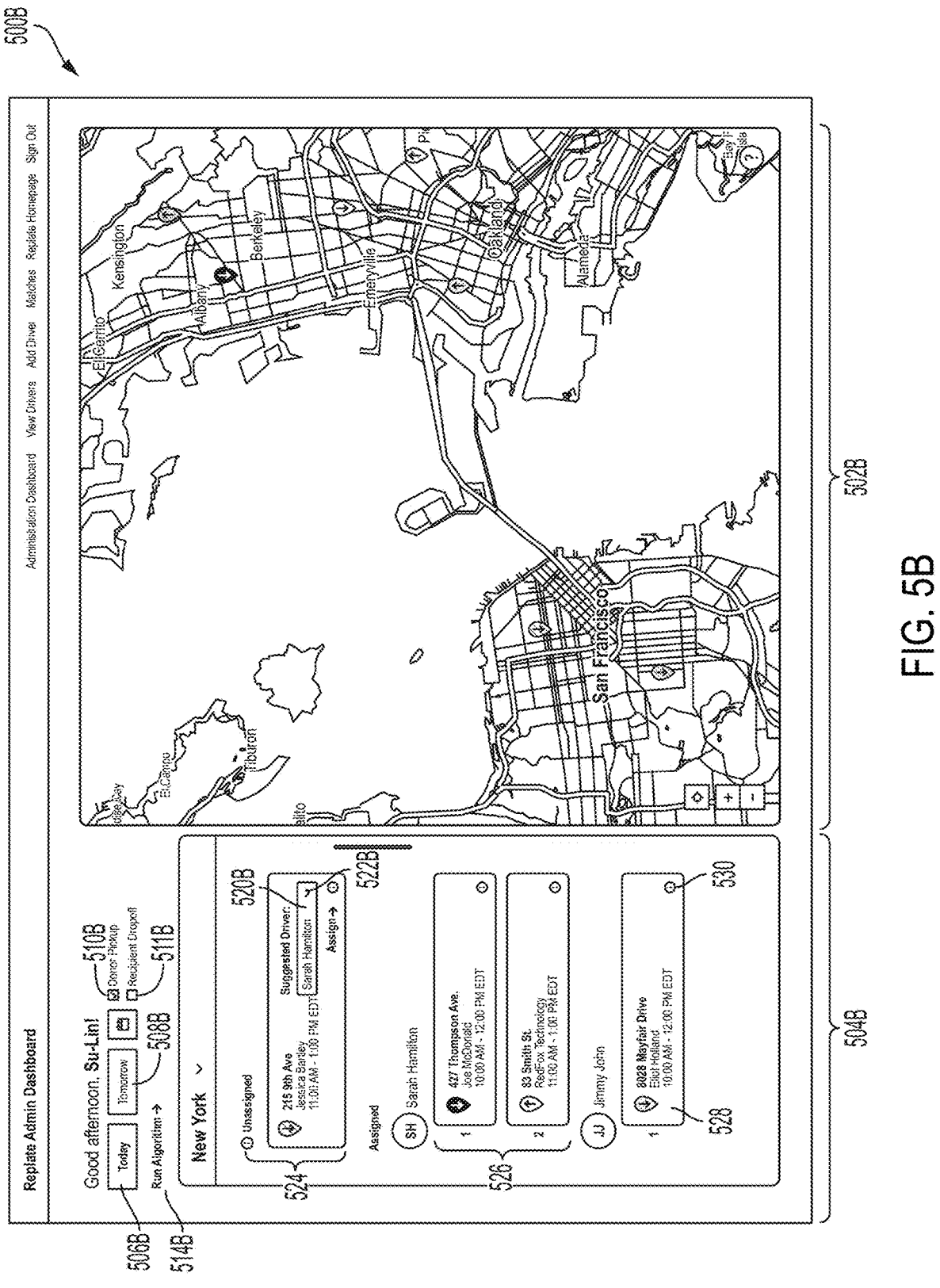
Figure 5C:
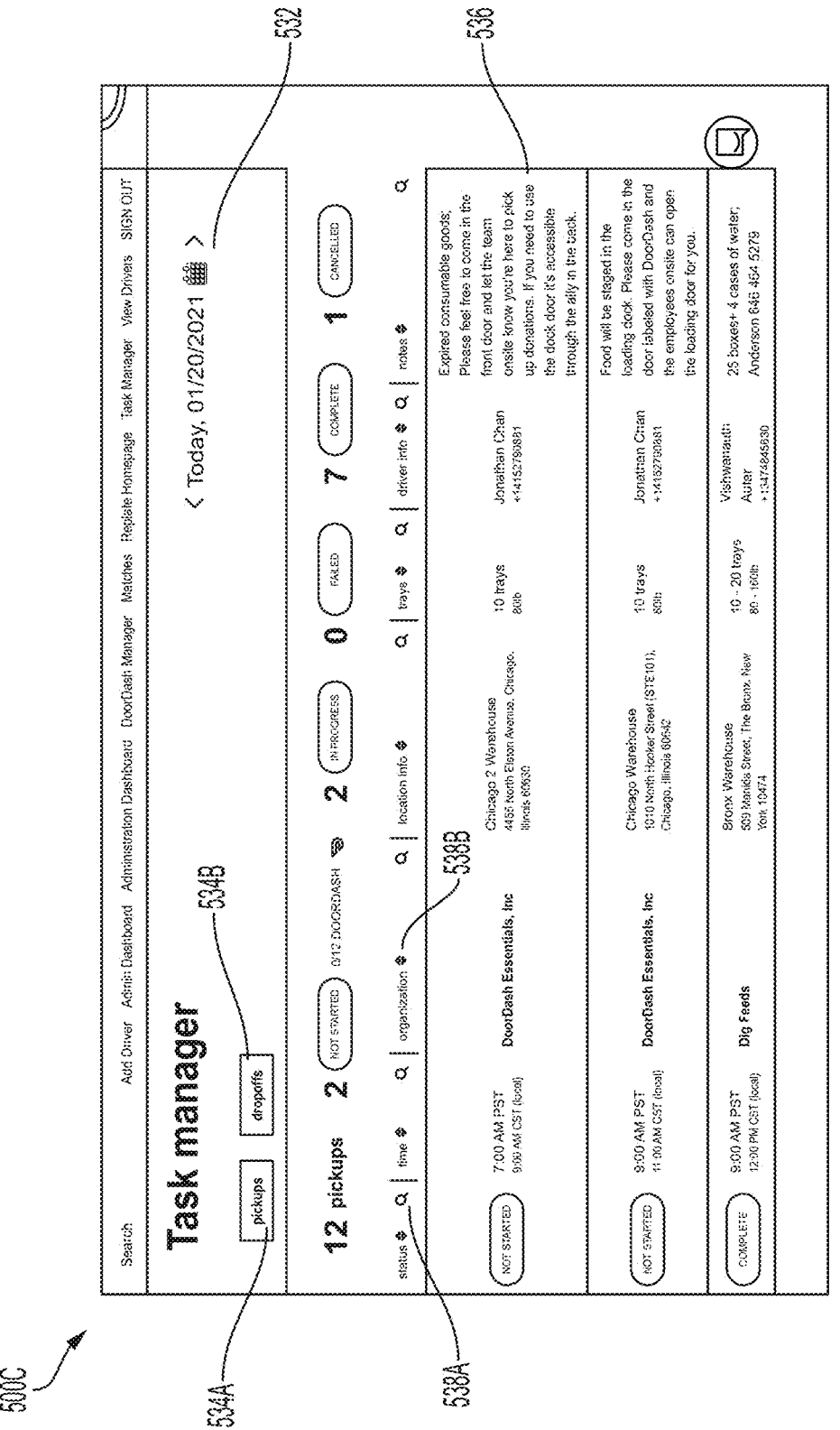

FIGS. 5A-C illustrate aspects of an exemplary user interface displayed to an administrator associated with the system for delivering food from donors to recipients, according to one or more examples. In one or more examples, the administrator may be a member of an operations team. In one or more examples, access to the screens described with respect to FIGS. 5A-C may be restricted to members of the operations team.

In one or more examples, screen 500A of the user interface, shown in FIG. 5A, may display an exemplary matches page associated with an administrator. In one or more examples, screen 500A may comprise a map region 502a for displaying location information in a map and a match region 504a for displaying match information. As discussed with respect to FIG. 3E, in one or more examples, the map region may be displayed by interfacing with one or more AIPs configured to interface with any external software platform used to display location information in a map.

In one or more examples, the map region may comprise a map of a geographic region for which a matching process is applied. As described above, the matching process may be applied to automatically generate driver-task matches for a geographic region (e.g., a selected zone indicative of a zone). In one or more examples, once a driver-task match is generated for the geographic region, the task corresponding to the match may automatically be displayed in the map region at a location corresponding to a location of the task. For example, each task may be associated with a graphical icon. In one or more examples, the icon may be displayed in association with the task in the match region and may be reproduced in the map region at the appropriate location. In one or more examples, icons for tasks may be color-coded, such that an administrator may easily be able to associate an icon displayed for a task in the map region with the corresponding icon displayed for the task in the match region. For example, a first task may be associated with a red icon displayed in both the match region and the map region, and a second task may be associated with a blue icon displayed in both the match region and the map region. Similarly, in one or more examples, once a driver-task match is generated for the geographic region, the driver corresponding to the match may automatically be displayed in the map region at a location corresponding to a start point and end point of the driver's task. Thus, an administrator may be able to compare a location of the driver to a location of the task. In one or more examples, a plurality of tasks and/or a plurality of drivers may be simultaneously displayed in the map region.

In one or more examples, the match region may comprise one or more user affordances for applying a matching process configured to generate one or more driver-task matches and/or one or more data tables for viewing the one or more generated driver-task matches.

In one or more examples, the one or more user affordances may be selected to rapidly apply a matching process configured to automatically generate driver-task matches. In one or more examples, the one or more user affordances may comprise user affordances (e.g., buttons 506a and 508a) for selecting a day for which to apply a matching process, user affordances (e.g., buttons 510a and 511a) for selecting a type of task (e.g., a pickup type of task, a drop-off type of task, or both) for which to apply a matching process, a user affordance (e.g., selectable text string 512a) for viewing performance metrics relation to the matching process that may be applied to automatically generate one or more driver-task matches, a user affordance (e.g., button 514a) for applying a matching process to automatically generate the one or more driver-task matches, and/or a user affordance (e.g., refresh icon 516) for refreshing a set of generated driver-task matches displayed in a data table (e.g., data table 518). Thus, in accordance with selection of the one or more user affordances, an administrator may select a day, a type of task, and/or a particular matching process to apply to generate driver-task matches. In one or more examples, as discussed above, display of the map region may dynamically be modified as driver-task matches are generated.

In one or more examples, each task corresponding to a generated driver-task match may be displayed in a data table (e.g., data table 518). In one or more examples, each of the tasks displayed in the data table may be associated with one or more attributes. In one or more examples, the one or more attributes may include a location name, a time, a date, an address, a quantity of meals/trays, dietary restrictions, and/or allergies. In one or more examples, each task displayed in the data table may additionally be associated with a suggested driver (as indicated by text string 520a). The suggested driver may be that driver automatically determined by applying a matching process. As described with respect to FIG. 2, an administrator may assign that driver to the task or may instead assign a different driver to the task by overriding the suggestion (as indicated by text string 522*a*). In one or more examples, tasks displayed in the data table may be grouped (e.g., by whether the task is unassigned or assigned and/or by driver assigned). Thus, the data table may display a plurality of sets of tasks, wherein a first set indicates unassigned tasks, a second set indicates tasks assigned to a first driver, and a third set indicates tasks assigned to a third driver. In one or more examples, display of the match region and/or the map region may dynamically be modified as information is provided about a task and/or as a task is assigned.

In one or more examples, screen 500A may display a first exemplary matches page, and screen 500B, shown in FIG. 5B, may display a second exemplary matches page. Thus, screen 500B may be a counterpart to screen 500A.

Screen 500A and screen 500B may share many similarities in the information displayed. Similar to screen 500A, screen 500B may comprise a map region 502*b* for displaying location information in a map, a match region 504*b* for displaying match information, user affordances (e.g., buttons 506*b* and 508*b*) for selecting a day for which to apply a matching process, user affordances (e.g., checkboxes 510*b* and 511*b*) for selecting a type of task (e.g., a pickup type of task, a drop-off type of task, or both) for which to apply a matching process, a user affordance (e.g., button 514*b*) for applying a matching process to automatically generate the one or more driver-task matches, an indication (e.g., in data field 520*b*) of a suggested driver associated with a task, and/or an option to override the suggestion (indicated by drop-down menu icon 522*b* associated with data field 520*b*). Moreover, similar to screen 500A, tasks corresponding to generated matches are shown in the match region grouped into sets based on whether the task corresponding has been assigned and/or based on driver assigned. A first set of tasks (e.g., set 524) may indicate unassigned tasks, a second set of tasks (e.g., set 526) may indicate tasks assigned to a first driver (e.g., Sarah Hamilton), and a third set of tasks (e.g., set 528) may indicate tasks assigned to a second driver (e.g., Jimmy John).

While screens 500A and 500B share many similarities in the information displayed, they differ in how the information is displayed. For example, the location and relative size of the map region and match region differ in the two exemplary examples shown. Moreover, as opposed to displaying a detailed view of generated driver-task matches in a data table, in screen 500B, driver-task matches are displayed in a summary view. In the summary view, information pertaining to only some attributes (e.g., address, location name, and time) associated with a task corresponding to a driver-task match is displayed. An administrator may select a user affordance (e.g., icon 530) to view additional information about the task.

While described with respect to two exemplary examples, it is to be understood that many possible configurations for the matches page screen are possible. In one or more examples, an administrator may be able to flexibly customize display of the matches page screen.

In one or more examples, a portion of the data discussed with respect to FIGS. 5A and 5B may be displayed to a driver in a screen associated with the driver. In one or more examples, the portion displayed to the driver corresponds to a portion of the data that the driver has permission to access (e.g., a portion of the data that is associated with the driver). In one or more examples, the portion that the driver has permission to access includes only those tasks assigned to the driver. Thus, a driver task page may include a match region and a map region. The match region may include only a set of tasks that correspond to the driver (and none of the user affordances for configuring and applying a matching process). The map region may similarly include an icon only for each task of the set of tasks that correspond to the driver.

In one or more examples, screen 500C of FIG. 5C may display a task manager page associated with an administrator. The task manager page may enable the administrator to view and/or manage tasks associated with a day. In one or more examples, the day for which tasks are displayed may be modified (e.g., in response to an administrator selection of calendar icon 532, a calendar may be displayed; the administrator may then select a different day on the calendar). In one or more examples, a set of tasks (e.g., each task associated with the day) may be displayed in a data table (e.g., data table 536). In one or more examples, the set of tasks displayed may include pickup tasks (e.g., in accordance with selection of button 534*a*) and/or drop-off tasks (e.g., in accordance with selection of button 534*b*).

In one or more examples, each task may be displayed in association with information pertaining to one or more attributes. In one or more examples, the one or more attributes associated with a task include a status, a time, an organization, a location, a quantity of food (e.g., a number of trays), driver information (e.g., name and/or contact information), and/or a note (e.g., a comment about a type of food included in the task and/or a building access instruction). In one or more examples, the administrator may filter the set of entities displayed. For example, the administrator may select graphical icon 538*a* to filter for tasks associated with a particular status (e.g., those tasks not started). Similarly, the administrator may select a graphical icon corresponding to a different attribute to filter for tasks associated with a different type of information (e.g., by selecting graphical icon 538*b* to filter for tasks associated with a particular time).

In one or more examples, an administrator may manage tasks associated with the day. In one or more examples, the administrator may manage active requests in real-time. For example, the administrator may manage requests received based on communication with the donor, recipient, or driver (e.g., via the chat platform described herein). In one or more examples, the administrator may manage a task by cancelling the task (e.g., in response to a request from a donor, recipient, or driver to cancel the task). In one or more examples, the administrator may additionally add a task in real-time. The administrator may add a pickup task in response to communication from a donor that the donor has excess food that they would like to be pickedup up the same day. Similarly, the administrator may add a drop-off task in response to communication from a recipient that the recipient would like another drop-off to be delivered the same day. Thus, the task manager page enables the administrator to supplement the automatically generated matches by actively managing matches for a day.

Moreover, in one or more examples, in addition to displaying information about individual tasks, screen 500C may display summary information about the tasks associated with the day. The summary information may provide an administrator with a quick and easy means to glean an overview of the tasks associated with the day. As shown in screen 500C, in one or more examples, the summary information may comprise information pertaining to a number of pickup and/or drop-off tasks scheduled for the day, a number of the tasks scheduled for the day that have not yet been started, a number of the tasks scheduled for the day that are assigned to an external logistics partner (e.g., DoorDash), a number of the tasks scheduled for the day that are in progress, a number of the tasks scheduled for the day that have failed, a number of the tasks scheduled for the day that have been completed, and/or a number of the tasks scheduled for the day that have been cancelled.

Figure 6:
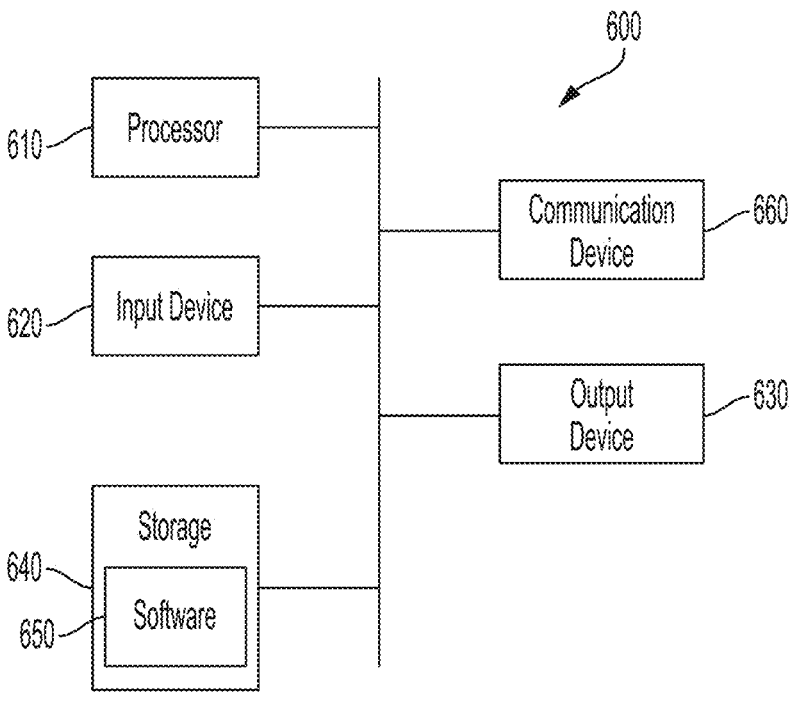
FIG. 6 illustrates a computing device, according to one or more examples.

FIG. 6 illustrates an example of a computer, according to one or more examples. Computer 600 can be a component of a system for delivering food from donors to recipients, according to the systems and methods described above, such as system 100 of FIG. 1, or can include the entire system itself. In one or more examples, computer 600 may execute a method for generating and/or a driver-task match, generating and/or displaying a driver-task assignment, and/or modifying one or more data sets.

Computer 600 can be a host computer connected to a network. Computer 600 can be a client computer or a server. As shown in FIG. 6, computer 600 can be any suitable type of microprocessor-based device, such as a personal computer, workstation, server, or handheld computing device, such as a phone or tablet. The computer can include, for example, one or more of processor 610, input device 620, output device 630, storage 640, and communication device 660. Input device 620 and output device 630 can correspond to those described above and can either be connectable or integrated with the computer.

Input device 620 can be any suitable device that provides input, such as a touch screen or monitor, keyboard, mouse, or voice-recognition device. Output device 630 can be any suitable device that provides an output, such as a touch screen, monitor, printer, disk drive, or speaker.

Storage 640 can be any suitable device that provides storage, such as an electrical, magnetic, or optical memory, including a random access memory (RAM), cache, hard drive, CD-ROM drive, tape drive, or removable storage disk. Communication device 660 can include any suitable device capable of transmitting and receiving signals over a network, such as a network interface chip or card. The components of the computer can be connected in any suitable manner, such as via a physical bus or wirelessly. Storage 640 can be a non-transitory computer-readable storage medium comprising one or more programs, which, when executed by one or more processors, such as processor 610, cause the one or more processors to execute methods described herein.

Software 650, which can be stored in storage 640 and executed by processor 610, can include, for example, the programming that embodies the functionality of the present disclosure (e.g., as embodied in the systems, computers, servers, and/or devices as described above). In one or more examples, software 650 can include a combination of servers such as application servers and database servers.

Software 650 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 640, that can contain or store programming for use by or in connection with an instruction execution system, apparatus, or device.

Software 650 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 600 can implement any operating system suitable for operating on the network. Software 650 can be written in any suitable programming language, such as C, C++, Java, or Python. In various examples, application software embodying the functionality of the present disclosure can be deployed in different configurations, such as in a client/server arrangement or through a Web browser as a Web-based application or Web service, for example.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The foregoing description, for the purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A method, comprising:

at a system comprising a server, a first electronic device associated with a first user and communicatively coupled to the server, and a second electronic device associated with a second user and communicatively coupled to the server, wherein the first electronic device includes a first display and a first interface configured to accept one or more inputs from a user of the electronic device, and wherein the second electronic device includes a second display and a second interface configured to accept one or more inputs from a second user of the second electronic device:

transmitting, by the server, first instructions for rendering and displaying a first set of screens and a second set of screens of a graphical user interface at the first electronic device;

in response to receiving the first instructions from the server, displaying, at the first display of the first electronic device, a first set of screens of the graphical user interface to enable the user to schedule one or more tasks, wherein the first set of screens comprise a location region for displaying one or more locations and a calendar region for displaying upcoming tasks that have been scheduled for the one or more locations, wherein each of the one or more locations associated with the user is displayed in a respective location region, wherein each respective location region comprises a graphical icon and a text indicator unique to the respective location;

in response to receiving the first instructions from the server, displaying, at the first display of the first electronic device, displaying a second set of screens of the graphical user interface to apply a matching process to match users to scheduled tasks, wherein the second set of screens are configured to enable the first user to apply the matching process for a geographic region and for a time period to generate data representing one or more optimized matches on a per-region and per-time-period basis;

transmitting, by the server, second instructions for rendering and displaying a third set of screens of the graphical user interface at the second electronic device; and in response to receiving the second instructions from the server, displaying, at the second display of the second electronic device, a third set of screens of the graphical user interface to enable the second user to view a portion of information from the second set of screens for which the user has permissions as determined based on the data representing the one or more optimized matches on the per-region and per-time-period basis, wherein the portion of the information is specifically associated with the second user, wherein the third set of screens comprises a match region and a map region, and wherein the map region displayed via the third set of screens includes one or more icons for tasks matched to the second user as indicated by the data representing the one or more optimized matches on the per-region and per-time-period basis;

receiving a user input executed via a respective location region of the first set of screens, wherein the user input comprises a request to view a calendar for the respective location, wherein the calendar comprises calendar data pertaining to upcoming tasks scheduled for a time period for the respective location; and in response to receiving the user input, modifying the display of the graphical user interface such that the calendar for the time period for the respective location is displayed via the first set of screens;

wherein the calendar is associated with metadata, wherein the metadata comprises one or more of:

invoice data pertaining to one or more tasks scheduled for the time period for the respective location;

impact data for tasks historically completed for the respective location; and demographic data pertaining to one or more users served by the task.

2. The method of claim 1, wherein the first user is a member of an organization, wherein the one or more locations are associated with the organization.

3. The method of claim 2, wherein at least one upcoming task is displayed at the first electronic device associated with the first user, wherein the at least one upcoming task has been scheduled by another user who is a member of the organization via another electronic device.

4. The method of claim 2, wherein the organization is associated with a plurality of locations, wherein each location associated with the organization is displayed in a respective location region of the first set of screens, wherein each respective location region is adjacent to at least one other location region.

5. The method of claim 1, wherein the method comprises:

receiving a user input to view a task in progress for the respective location; and in response to receiving the user input, displaying a window for tracking a location of a driver assigned to the task, wherein an estimated time of arrival for the driver is displayed in the window.

6. The method of claim 1, wherein the method comprises:

receiving a user input to schedule a task for the respective location;

in response to receiving the user input, displaying a window for scheduling the task;

receiving a user input to specify one or more parameters for the task, wherein the user input to specify one or more parameters is executed via the window; and scheduling the task in accordance with the one or more parameters.

7. The method of claim 6, wherein the window for scheduling the task comprises:

a first data field for naming the task, wherein a task name is a first parameter of the task;

one or more user affordances for scheduling the task, wherein scheduling the task comprises scheduling a date and a time for the task, wherein a task date is a second parameter of the task and a task time is a third parameter of the task;

a second data field for specifying a quantity of items included in the task, wherein a quantity of items is a fourth parameter of the task; and a third data field for inputting one or more comments for the task, wherein a comment is a fifth parameter of the task.

8. The method of claim 1, wherein the calendar region comprises a calendar that comprises a respective day region for each day included in a time period, wherein upcoming tasks are grouped by day, wherein a group of tasks is displayed for a day.

9. The method of claim 8, wherein the method comprises:

receiving a user input executed via the calendar region, wherein the user input comprises an input to schedule a task;

in response to receiving the input, displaying a window for scheduling the task;

receiving one or more user inputs to schedule the task;

scheduling the task in accordance with the one or more inputs; and updating the display of the calendar based on the scheduled task.

10. The method of claim 1, wherein the location region and the calendar region are adjacent to each other, wherein a size of the location region and a size of the calendar region are modified in accordance with a user preference.

11. The method of claim 1, wherein the first user is an administrator, wherein the first user has permission to access the second set of screens to enable the first user to apply the optimization process.

12. The method of claim 11, wherein the method comprises:

receiving a user input to specify the geographic region;

receiving a user input to specify the time period;

receiving a user input to specify a type of task;

receiving a user input to apply the optimization process for upcoming tasks based on the type of task, the geographic region, and the time period; and in response to applying the optimization process, generating and displaying a respective suggested driver-task match for each task for which the optimization process is applied, wherein a respective driver-task match indicates a suggested assignation of a respective driver to a respective task.

13. The method of claim 12, wherein the type of task is selected from:

a pickup task to pick up one or more items from a donor; and a drop-off task to drop-off one or more items at a recipient.

14. The method of claim 12, wherein the method comprises:

receiving a user input to assign a respective driver to a respective task;

in response to the user input, assigning the respective driver to the respective task; and displaying the assigned driver-task match.

15. The method of claim 14, wherein the user input to assign a respective driver to a respective task comprises accepting a respective suggested driver-task match.

16. The method of claim 14, wherein the user input to assign a respective driver to a respective task comprises, for a task:

overriding the driver-task match; and assigning a new driver to the task.

17. The method of claim 14, wherein the method comprises:

in response to assigning each task to a respective driver, grouping the tasks by driver; and displaying the tasks in accordance with the grouping.

18. The method of claim 14, wherein the method comprises:

displaying a location of each assigned task on a map, wherein the assigned driver-task matches are displayed in a first region of the graphical user interface and the map is displayed in a second region of the graphical user interface, wherein the first region and the second region are adjacent to each other.

19. The method of claim 11, wherein the method comprises:

displaying a task manager page, wherein task data for a set of upcoming tasks scheduled for a time period is displayed, wherein the set of upcoming tasks are displayed in a list such that first task data for a first task is displayed above second task data for a second task.

20. The method of claim 19, wherein task data for an upcoming task comprises one or more of:

a task status data field, wherein the task status indicates progress toward completion of the task;

a task time data field, wherein the task time indicates a scheduled time for completing the task;

a task organization data field, wherein the organization indicates an organization for whom the task is being completed;

a task location data field, wherein the task location indicates an address of a location for completing the task;

a task quantity data field, wherein the task quantity indicates a quantity of items included in the task;

a driver data field, wherein the driver indicates a name of a driver assigned to the task; and a comment data field, wherein the comment indicates information for completing the task.

21. The method of claim 20, wherein one or more of the data fields are organized, filtered, or a combination thereof in accordance with one or more user inputs.

22. The method of claim 19, wherein task data for a subset of the upcoming tasks is displayed, wherein the subset of tasks comprises each task of a type of task, wherein the type of task is a pickup task or a drop-off task.

23. The method of claim 22, wherein the task manager page comprises a first region in which respective task data for each of the subset of tasks is displayed and a second region in which summary data pertaining to the subset of tasks is displayed, wherein the summary data includes one or more indications of task status for the subset of tasks.

\* \* \* \* \*